(12) United States Patent
Zhang et al.

(10) Patent No.: US 11,582,639 B2
(45) Date of Patent: Feb. 14, 2023

(54) INFORMATION TRANSMISSION METHOD, RELATED DEVICE, AND SYSTEM

(71) Applicant: HUAWEI TECHNOLOGIES CO., LTD., Guangdong (CN)

(72) Inventors: Di Zhang, Beijing (CN); Kunpeng Liu, Beijing (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 138 days.

(21) Appl. No.: 16/989,182

(22) Filed: Aug. 10, 2020

(65) Prior Publication Data
US 2020/0374749 A1 Nov. 26, 2020

Related U.S. Application Data

(63) Continuation of application No. PCT/CN2019/074605, filed on Feb. 2, 2019.

(30) Foreign Application Priority Data

Feb. 12, 2018 (CN) .......................... 201810148379.9

(51) Int. Cl.
*H04W 72/12* (2009.01)
*H04W 28/04* (2009.01)
*H04W 24/10* (2009.01)

(52) U.S. Cl.
CPC .......... *H04W 28/04* (2013.01); *H04W 24/10* (2013.01); *H04W 72/1289* (2013.01)

(58) Field of Classification Search
CPC .. H04W 24/10; H04W 28/04; H04W 72/1289
See application file for complete search history.

(56) References Cited

U.S. PATENT DOCUMENTS 10,542,545 B2 * 1/2020 Yu ........................ H04B 7/0695
2013/0148158 A1 6/2013 Kanakubo
(Continued)

FOREIGN PATENT DOCUMENTS

| CN | 101483927 A | 7/2009 |
| CN | 102036284 A | 4/2011 |

(Continued)

OTHER PUBLICATIONS

MediaTek Inc., "Summary for Remaing issues on Beam Failure Recovery", 3GPP TSG RAN WG1 Meeting #AH1801 R1-1801089, Jan. 26, 2018, total 17 pages.
InterDigital, Inc., Remaining details on beam failure recovery. 3GPP TSG RAN WG1 Meeting AH 1801, Vancouver, Canada, Jan. 22-26, 2018, R1-1800629, 3 pages.
(Continued)

*Primary Examiner* — Brian P Cox
(74) *Attorney, Agent, or Firm* — Womble Bond Dickinson (US) LLP

(57) ABSTRACT

Embodiments of the present invention disclose an information transmission method, a related device, and a system. The method includes: determining, by a terminal device at a moment n, that a communication failure occurs on a physical downlink control channel (PDCCH) on a first control resource set; and if the terminal device detects, within a first time period after the moment n, that channel quality of the PDCCH on the first control resource set meets a first preset condition, canceling, by the terminal device, sending of communication failure recovery request information, and/or stopping, by the terminal device, timing of a communication failure recovery clock. In the embodiments of the present invention, a communication link can be rapidly recovered after a communication failure occurs.

20 Claims, 18 Drawing Sheets

(56) References Cited

U.S. PATENT DOCUMENTS

2014/0362750 A1* 12/2014 Song .................. H04W 52/0206
370/311
2021/0058133 A1* 2/2021 Takeda ................ H04W 72/042

FOREIGN PATENT DOCUMENTS

| CN | 102845122 | A  | 12/2012 |
|----|-----------|----|---------|
| CN | 102939725 | A  | 2/2013  |
| CN | 105101253 | A  | 11/2015 |
| CN | 107005858 | A  | 8/2017  |
| CN | 107079459 | A  | 8/2017  |
| CN | 107409020 | A  | 11/2017 |
| EP | 2916581   | A1 | 9/2015  |
| WO | 2014069382| A1 | 5/2014  |
| WO | 2018004509| A1 | 1/2018  |

OTHER PUBLICATIONS

3GPP TSG RAN WG1 Meeting AH 1801,R1-1800661,Remaining issues on beam recovery,NTT Docomo, Vancouver, Canada, Jan. 22, 26, 2018,total 5 pages.
CATT: "RA Procedure and Parameters for BFR", 3GPP Draft; R2-1800254,Jan. 12, 2018,XP051386104,total 6 pages.
Mediatek Inc: "MAC Functions to Support Beam Management and Beam Recovery",3GPP Draft; R2-1712870,Nov. 17, 2017,XP051371753,total 8 pages.
NTT Docomo: "Views on beam recovery",3GPP Draft; R1-1718193,Oct. 8, 2017 (Oct. 8, 2017), XP051341375, total 10 pages.
Samsung: "Beam failure recovery", 3GPP Draft; R1-1720291,Dec. 1, 2017 (Dec. 1, 2017), pp. 1-8, XP051368940.
ATandT, Beam Recovery for Full and Partial Control Channel Failure. 3GPP TSG RAN WG1 Meeting 90bis, Prague, Czech Republic, Oct. 9, 13, 2017, R1-1718389, 6 pages.

* cited by examiner

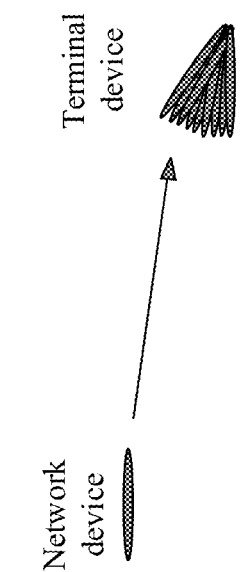
FIG. 2(a) Joint beam training in a downlink
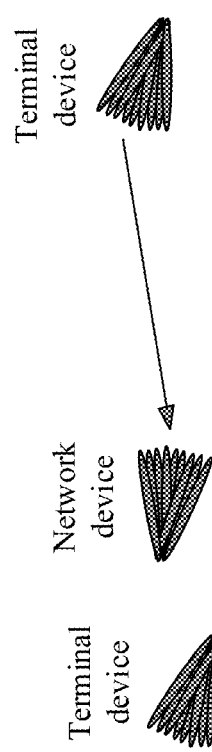
FIG. 2(b) Joint beam training in an uplink
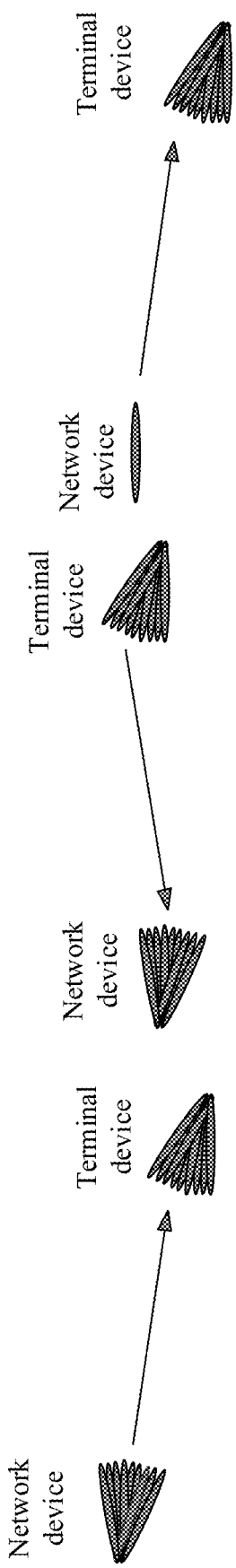
FIG. 2(c) Terminal beam training in a downlink
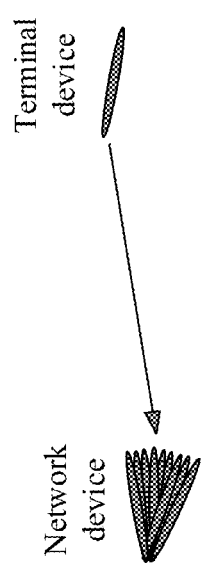
FIG. 2(d) Terminal beam training in an uplink
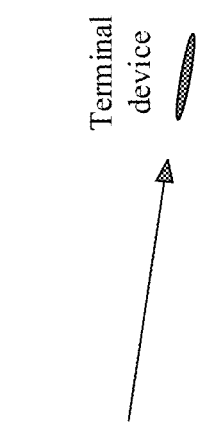
FIG. 2(e) Network device beam training in a downlink
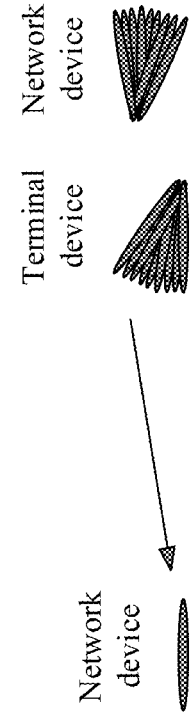
FIG. 2(f) Network device beam training in an uplink

INFORMATION TRANSMISSION METHOD, RELATED DEVICE, AND SYSTEM

CROSS-REFERENCE TO RELATED APPLICATIONS

This application is a continuation of International Application No. PCT/CN2019/074605, filed on Feb. 2, 2019, which claims priority to Chinese Patent Application No. 201810148379.9, filed on Feb. 12, 2018. The disclosures of the aforementioned applications are hereby incorporated by reference in their entireties.

TECHNICAL FIELD

This application relates to the field of wireless communications technologies, and in particular, to an information transmission method, a related device, and a system.

BACKGROUND

With emergence of intelligent terminals, and in particular, video services, current spectrum resources already hardly satisfy explosively growing capacity requirements of users. A high frequency band with a larger available bandwidth, especially a millimeter-wave band, gradually becomes a candidate frequency band of a next generation communications system. However, it is different from an operating band of an existing system such as an LTE (long term evolution) system that the high frequency band causes a larger path loss, and especially, a loss in radio propagation further becomes larger due to factors such as atmosphere and vegetation.

To overcome the larger propagation loss, a signal transmission mechanism that is based on a beamforming technology is applied, with the intention of using a relatively high antenna gain to compensate for the loss in a signal propagation process. A beamforming signal may include a broadcast channel, a synchronization signal, a cell-specific reference signal, or the like. When a signal is transmitted based on the beamforming technology, once a user moves, a direction of a beamformed beam corresponding to the transmitted signal may not match a location of the user after the movement, and interruption to receiving of the signal may occur frequently. To track a change of the beamformed beam in the signal transmission process, channel quality measurement and result reporting that are based on the beamforming technology are introduced. After measuring a plurality of beams sent by a base station, UE (user equipment) selects N best beams of the base station, and reports measurement information of the N best beams to the base station. Via a beam training process, the base station obtains N best beam pairs (Beam Pair Link, BPL) used for communication with the UE. During subsequent communication with the UE, the base station uses the information to transmit data.

However, in a communication process, an obstacle exists, and a diffraction capability on a high frequency channel is poor. Consequently, a currently serving beam is blocked, the signal cannot continue to be transmitted, and a communication failure occurs. How to rapidly recover a link after the obstacle disappears is a technical problem that needs to be resolved currently.

SUMMARY

This application provides an information transmission method, a related device, and a system, to rapidly recover a communication link after a communication failure occurs.

According to a first aspect, an embodiment of the present invention provides an information transmission method, applied to a terminal device side. The method includes: determining, by a terminal device at a moment n, that a communication failure occurs on a physical downlink control channel (PDCCH) on a first control resource set; and if the terminal device detects, within a first time period after the moment n, that channel quality of the PDCCH on the first control resource set meets a first preset condition, canceling, by the terminal device, sending of communication failure recovery request information, and/or stopping, by the terminal device, timing of a communication failure recovery clock.

According to a second aspect, an embodiment of the present invention provides an information transmission method, applied to a network device side. The method includes: sending, by a network device, a PDCCH by using a first control resource set within a first time period after a moment n, where the moment n is a moment at which a communication failure occurs on the PDCCH on the first control resource set.

According to the method in the first aspect or the second aspect, after the communication failure occurs on the PDCCH on the first control resource set, if the terminal device detects that the channel quality of the PDCCH on the first control resource set meets a specific condition, the terminal device cancels or stops a communication failure recovery process, and may continue to use the first control resource set to receive the PDCCH. Compared with a manner in which the terminal device waits for the network device to reconfigure quasi co-location (QCL) assumption information after the communication failure occurs on the PDCCH on the first control resource set, this can rapidly recover a link after a fault occurs on the link.

In some embodiments, the canceling, by the terminal device, sending of communication failure recovery request information includes: stopping, by the terminal device, counting of a communication failure recovery counter.

In one embodiment, the first control resource set includes one or more control resource sets.

In one embodiment, the first control resource set is a CORESET, a control region, or an ePDCCH set.

In one embodiment, the network device configures, for the terminal, a reference signal resource set used for communication failure detection, and the terminal device can determine, by identifying the reference signal resource set, whether the communication failure occurs on the PDCCH on the first control resource set. When channel quality information (such as reference signal received power (RSRP), reference signal received quality (RSRQ), a channel quality indicator (CQI), a block error rate (BLER), a signal to interference plus noise ratio (SINR), and a signal-to-noise ratio (SNR), where the BLER may be a hypothetical PDCCH BLER, that is, a hypothetical PDCCH BLER) corresponding to a part of or all reference signals in the reference signal resource set is less than or equal to a preset threshold, it is determined that the communication failure occurs. That channel quality information is less than or equal to a preset threshold may be that the channel quality information is less than or equal to the preset threshold W consecutive times, or the channel quality information is less than or equal to the preset threshold W times within a particular time period, or the channel quality information is less than or equal to the preset threshold W of Z times. Optionally, the preset threshold may be the same as an OOS threshold for a radio link failure.

In one embodiment, an end moment of the first time period is earlier than or equal to a moment at which the terminal device receives communication failure recovery response information, or an end moment of the first time period is earlier than or equal to a moment at which the terminal device receives reconfigured quasi co-location QCL assumption information for the first time after receiving communication failure recovery response information.

That the terminal device receives QCL assumption information means that the terminal device receives TCI reconfiguration information sent by the network device. The TCI reconfiguration information may be configured for the PDCCH, and used to indicate QCL information of the PDCCH. In this case, the QCL information indicates that a DMRS on the PDCCH has a QCL relationship with a reference signal indicated by the TCI reconfiguration information. Alternatively, the TCI reconfiguration information may be configured for a PDSCH, and used to indicate QCL information of the PDSCH. In this case, the QCL information indicates that a DMRS on the PDSCH has a QCL relationship with a reference signal indicated by the TCI reconfiguration information.

In one embodiment, a start moment of the first time period is later than or equal to the moment n, and/or the end moment of the first time period is earlier than or equal to a moment at which the terminal device sends the communication failure recovery request information for the first time after the moment n.

In one embodiment, the start moment of the first time period is later than or equal to an end moment of a communication failure recovery response time window, and/or the end moment of the first time period is earlier than or equal to a moment at which the terminal device sends the communication failure recovery request information for a next time after the communication failure recovery response time window.

The communication failure recovery response time window is used to detect the communication failure recovery response information.

In one embodiment, the start moment and/or the end moment of the first time period may be defined in a protocol, or may be configured by the network device.

In one embodiment, that channel quality of the PDCCH on the first control resource set meets a first preset condition includes: the terminal device detects the PDCCH on the first control resource set L times, where L is a positive integer greater than or equal to 1; channel quality corresponding to a demodulation reference signal (DMRS) on the PDCCH is greater than or equal to channel quality corresponding to a first reference signal, where the first reference signal is a downlink reference signal that is associated with the communication failure recovery request information and that is greater than or equal to a first threshold; a difference between the channel quality corresponding to the DMRS on the PDCCH and signal quality of the first reference signal is greater than or equal to a second threshold; the channel quality corresponding to the DMRS on the PDCCH is greater than or equal to a third threshold; channel quality corresponding to a second reference signal is greater than or equal to the channel quality corresponding to the first reference signal, where the second reference signal is used to detect that the communication failure occurs on the PDCCH on the first control resource set; a difference between the channel quality corresponding to the second reference signal and the signal quality of the first reference signal is greater than or equal to a fourth threshold; and/or the channel quality corresponding to the second reference signal is greater than or equal to a fifth threshold.

Herein, the second reference signal corresponding to the first control resource set may be used to determine whether the communication failure occurs on the PDCCH on the first control resource set.

In one embodiment, that the terminal device detects the PDCCH on the first control resource set means that the terminal device can correctly decode the PDCCH on the first control resource set or the terminal device can successfully decode the PDCCH on the first control resource set.

In one embodiment, that the terminal device detects the PDCCH on the first control resource set L times includes: the terminal device detects the PDCCH on the first control resource set L consecutive times, the terminal device detects the PDCCH on the first control resource set L times within a first preset time period, or the terminal device detects the PDCCH on the first control resource set L of P times for detecting the PDCCH on the first control resource set, where P is a positive integer greater than or equal to L.

In one embodiment, that channel quality corresponding to a DMRS on the PDCCH is greater than or equal to channel quality corresponding to a first reference signal includes: the channel quality corresponding to the DMRS on the PDCCH is greater than or equal to the channel quality corresponding to the first reference signal M1 times.

In one embodiment, that the channel quality corresponding to the DMRS on the PDCCH is greater than or equal to the channel quality corresponding to the first reference signal M1 times includes: the channel quality corresponding to the DMRS on the PDCCH is greater than or equal to the channel quality corresponding to the first reference signal M1 consecutive times, the channel quality corresponding to the DMRS on the PDCCH is greater than or equal to the channel quality corresponding to the first reference signal M1 times within a second preset time period, or the channel quality corresponding to the DMRS on the PDCCH is greater than or equal to the channel quality corresponding to the first reference signal M1 of O1 times.

In one embodiment, that a difference between the channel quality corresponding to the DMRS on the PDCCH and signal quality of the first reference signal is greater than or equal to a second threshold includes: the difference between the channel quality corresponding to the DMRS on the PDCCH and the signal quality of the first reference signal is greater than or equal to the second threshold M2 times.

In one embodiment, that the difference between the channel quality corresponding to the DMRS on the PDCCH and the signal quality of the first reference signal is greater than or equal to the second threshold M2 times includes: the difference between the channel quality corresponding to the DMRS on the PDCCH and the signal quality of the first reference signal is greater than or equal to the second threshold M2 consecutive times, the difference between the channel quality corresponding to the DMRS on the PDCCH and the signal quality of the first reference signal is greater than or equal to the second threshold M2 times within a third preset time period, or the difference between the channel quality corresponding to the DMRS on the PDCCH and the signal quality of the first reference signal is greater than or equal to the second threshold M2 of O2 times.

In one embodiment, that the channel quality corresponding to the DMRS on the PDCCH is greater than or equal to a third threshold includes: the channel quality corresponding to the DMRS on the PDCCH is greater than or equal to the third threshold M3 times.

In one embodiment, that the channel quality corresponding to the DMRS on the PDCCH is greater than or equal to the third threshold M3 times includes: the channel quality corresponding to the DMRS on the PDCCH is greater than or equal to the third threshold M3 consecutive times, the channel quality corresponding to the DMRS on the PDCCH is greater than or equal to the third threshold within a fourth preset time period, or the channel quality corresponding to the DMRS on the PDCCH is greater than or equal to the third threshold M3 of O3 times.

In one embodiment, that channel quality corresponding to a second reference signal is greater than or equal to the channel quality corresponding to the first reference signal includes: the channel quality corresponding to the second reference signal is greater than or equal to the channel quality corresponding to the first reference signal M4 times.

In one embodiment, that the channel quality corresponding to the second reference signal is greater than or equal to the channel quality corresponding to the first reference signal M4 times includes: the channel quality corresponding to the second reference signal is greater than or equal to the channel quality corresponding to the first reference signal M4 consecutive times, the channel quality corresponding to the second reference signal is greater than or equal to the channel quality corresponding to the first reference signal M4 times within a fifth preset time period, or the channel quality corresponding to the second reference signal is greater than or equal to the channel quality corresponding to the first reference signal M4 of O4 times.

In one embodiment, that a difference between the channel quality corresponding to the second reference signal and the signal quality of the first reference signal is greater than or equal to a fourth threshold includes: the difference between the channel quality corresponding to the second reference signal and the signal quality of the first reference signal is greater than or equal to the fourth threshold M5 times.

In one embodiment, that the difference between the channel quality corresponding to the second reference signal and the signal quality of the first reference signal is greater than or equal to the fourth threshold M5 times includes: the difference between the channel quality corresponding to the second reference signal and the signal quality of the first reference signal is greater than or equal to the fourth threshold M5 consecutive times, the difference between the channel quality corresponding to the second reference signal and the signal quality of the first reference signal is greater than or equal to the fourth threshold M5 times within a sixth preset time period, or the difference between the channel quality corresponding to the second reference signal and the signal quality of the first reference signal is greater than or equal to the fourth threshold M5 of O5 times.

In one embodiment, that the channel quality corresponding to the second reference signal is greater than or equal to a fifth threshold includes: the channel quality corresponding to the second reference signal is greater than or equal to the fifth threshold M6 times.

In one embodiment, that the channel quality corresponding to the second reference signal is greater than or equal to the fifth threshold M6 times includes: the channel quality corresponding to the second reference signal is greater than or equal to the fifth threshold M6 consecutive times, the channel quality corresponding to the second reference signal is greater than or equal to the fifth threshold within a seventh preset time period, or the channel quality corresponding to the second reference signal is greater than or equal to the fifth threshold M6 of O6 times.

In one embodiment, the first threshold to the sixth threshold may be specified in a protocol, or may be configured by the network device.

With reference to the first aspect or the second aspect, in some optional embodiments, the third threshold and the fifth threshold each may be an IS threshold for a radio link failure.

It should be noted that M1 to M6 and O1 to O6 are all positive integers.

In one embodiment, the channel quality includes one or more of reference signal received power (RSRP), reference signal received quality (RSRQ), a channel quality indicator (CQI), a block error rate (BLER), a signal to interference plus noise ratio (SINR), and a signal-to-noise ratio (SNR). The BLER may be a hypothetical PDCCH BLER, that is, a hypothetical PDCCH BLER. One or more means at least one.

In one embodiment, a delay between the moment n and the moment at which the terminal device sends the communication failure recovery request information for the first time after the moment n is greater than or equal to a sixth threshold.

In one embodiment, the sixth threshold may be predefined in a protocol or configured by the network device for the terminal device.

In one embodiment, the method further includes: detecting, by the terminal device, the PDCCH on the first control resource set within the first time period.

In one embodiment, the method further includes: skipping detecting, by the terminal device, the PDCCH on the first control resource set and a PDCCH on a second control resource set within a second time period after sending the communication failure recovery request information by the terminal device, where the second control resource set is used by the network device to send the communication failure recovery response information to the terminal device, and an end moment of the second time period is earlier than or equal to a start moment of a next communication failure recovery response time window after sending the communication failure recovery request information by the terminal device.

The communication failure recovery response time window is used to detect the communication failure recovery response information.

That the terminal device does not detect the PDCCH on the first control resource set means that the terminal device skips detecting the PDCCH on the first control resource set. That the terminal device does not detect a PDCCH on a second control resource set means that the terminal device skips detecting the PDCCH on the second control resource set.

In one embodiment, the terminal device detects only the PDCCH on the second control resource set within a communication failure recovery response time window, where the second control resource set is used by the network device to send the communication failure recovery response information to the terminal device.

In one embodiment, that the communication failure occurs on the physical downlink control channel PDCCH on the first control resource set includes: the second reference signal corresponding to the first control resource set is less than or equal to a seventh threshold Q consecutive times, where Q starts to be counted when a reference signal corresponding to a maximum periodicity in the second reference signal is less than or equal to the seventh threshold, and the second reference signal is used to determine that the communication failure occurs on the PDCCH on the first control resource set.

In one embodiment, if the terminal device detects, within the first time period after the moment n, that the channel quality of the PDCCH on the first control resource set meets the first preset condition, the terminal device cancels sending of the communication failure recovery request information and/or stops timing of the communication failure recovery clock, in other words, the terminal device cancels or stops the communication failure recovery process. Otherwise, the terminal device continues to send the communication failure recovery request information and/or proceeds with timing of the communication failure recovery clock, in other words, the terminal device proceeds with the communication failure recovery process.

With reference to the first aspect or the second aspect, in some embodiments, the "moment" described in the foregoing embodiments may be an instantaneous location or an instantaneous time in a communication transmission process, or may be represented as a time unit, where the time unit may be a time-domain unit such as a subframe, a slot, or a symbol. The "time window" or the "time period" described in the foregoing embodiments may be represented as a time or a time domain resource between one time unit and another time unit in a communication transmission process, for example, may be a time between two slots, a time between two subframes, or a time between two symbols.

According to a third aspect, an embodiment of the present invention provides another information transmission method, applied to a terminal device side. The method includes: determining, by a terminal device at a moment n, that a communication failure occurs on a PDCCH on a first control resource set; and if the terminal device detects the first control resource set and a second control resource set within a third time period after the moment n, selecting, by the terminal device from the first control resource set and the second control resource set, a control resource set corresponding to channel quality that meets a second preset condition, to receive physical downlink control information, where the second control resource set is used by the terminal device to receive communication failure recovery response information.

According to a fourth aspect, an embodiment of the present invention provides another information transmission method, applied to a network device side. The method includes: sending, by a network device, a first control resource set and a second control resource set within a third time period after a moment n, where the moment n is a moment at which a communication failure occurs on a PDCCH on the first control resource set, the second control resource set is used by the network device to send communication failure recovery response information to a terminal device, and the terminal device selects, from the first control resource set and the second control resource set, a control resource set that meets a second preset condition, to receive physical downlink control information.

According to the method in the third aspect or the fourth aspect, after the communication failure occurs on the PDCCH on the first control resource set, if the terminal device detects both the PDCCH on the first control resource set and a PDCCH on a control resource set used for link recovery, the terminal device selects a PDCCH with better channel quality in a control resource set to receive downlink control information. Therefore, communication transmission quality is improved.

In one embodiment, after selecting, from the first control resource set and the second control resource set, the control resource set corresponding to the channel quality that meets the second preset condition, the terminal device sends, to the network device, information about the selected control resource set corresponding to the channel quality that meets the second preset condition; and the network device receives the information, sent by the terminal device, about the control resource set that meets the second preset condition, and then sends the PDCCH to the terminal device by using the control resource set that meets the second preset condition.

In one embodiment, the control resource set, from the first control resource set and the second control resource set, corresponding to the channel quality the meets the second preset condition includes: higher channel quality in channel quality corresponding to a DMRS corresponding to the first control resource set and channel quality corresponding to a DMRS corresponding to the second control resource set, higher channel quality in channel quality corresponding to a DMRS corresponding to the first control resource set and channel quality corresponding to a first reference signal corresponding to the second control resource set, higher channel quality in channel quality corresponding to a second reference signal corresponding to the first control resource set and channel quality corresponding to a DMRS corresponding to the second control resource set, or higher channel quality in channel quality corresponding to a second reference signal corresponding to the first control resource set and channel quality corresponding to a first reference signal corresponding to the second control resource set, where the first reference signal is a downlink reference signal that is associated with communication failure recovery request information and that is greater than or equal to an eighth threshold, and the second reference signal is used to detect that the communication failure occurs on the PDCCH on the first control resource set.

In one embodiment, a start moment of the third time period is later than or equal to a moment at which the terminal device receives the communication failure recovery response information, and/or an end moment of the third time period is earlier than or equal to a moment at which the terminal device receives reconfigured QCL assumption information for the first time after receiving the communication failure recovery response information.

In one embodiment, the channel quality includes one or more of reference signal received power (RSRP), reference signal received quality (RSRQ), a block error ratio (BLER), a signal to interference plus noise ratio (SINR), a signal-to-noise ratio (SNR), and a channel quality indicator (CQI). Herein, one or more means at least one.

In one embodiment, that the communication failure occurs on the PDCCH on the first control resource set includes: the second reference signal corresponding to the first control resource set is less than or equal to a ninth threshold Q consecutive times, where Q starts to be counted when a reference signal corresponding to a maximum periodicity in the second reference signal is less than or equal to the ninth threshold, and the second reference signal is used to detect that the communication failure occurs on the PDCCH on the first control resource set.

In one embodiment, the method further includes: detecting, by the terminal device, the first control resource set and the second control resource set within the third time period after the moment n.

In one embodiment, the "moment" described in the foregoing embodiments may be an instantaneous location or an instantaneous time in a communication transmission process, or may be represented as a time unit, where the time unit may be a time-domain unit such as a subframe, a slot, or a symbol. The "time window" or the "time period" described in the foregoing embodiments may be represented as a time or a time domain resource between one time unit and another time unit in a communication transmission process, for example, may be a time between two slots, a time between two subframes, or a time between two symbols.

According to a fifth aspect, an embodiment of the present invention provides a communication failure detection method, where the method includes: determining, by a terminal device, that a communication failure occurs on a PDCCH on a first control resource set, where that the communication failure occurs on the PDCCH on the first control resource set includes: a second reference signal corresponding to the first control resource set is less than or equal to a tenth threshold Q consecutive times, where Q starts to be counted when a reference signal corresponding to a maximum periodicity in the second reference signal is less than or equal to the tenth threshold, and the second reference signal is used to determine that the communication failure occurs on the PDCCH on the first control resource set.

According to a sixth aspect, an embodiment of the present invention provides a terminal device. The terminal device may include a plurality of functional modules or units, configured to correspondingly perform the information transmission method provided in the first aspect or the third aspect.

According to a seventh aspect, an embodiment of the present invention provides a network device. The network device may include a plurality of functional modules or units, configured to correspondingly perform the information transmission method provided in the second aspect or the fourth aspect.

According to an eighth aspect, an embodiment of the present invention provides a terminal device, configured to perform the information transmission method provided in the first aspect or the third aspect. The terminal device may include: a memory, a processor coupled to the memory, and a transceiver coupled to the memory. The transceiver is configured to communicate with another communications device (for example, a network device). The memory is configured to store code for implementing the information transmission method provided in the first aspect or the third aspect. The processor is configured to execute program code stored in the memory, to perform the information transmission method provided in the first aspect or the third aspect.

According to a ninth aspect, an embodiment of the present invention provides a network device, configured to perform the information transmission method provided in the second aspect or the fourth aspect. The network device may include: a memory, a processor coupled to the memory, and a transceiver coupled to the memory. The transceiver is configured to communicate with another communications device (for example, a terminal device). The memory is configured to store code for implementing the information transmission method provided in the second aspect or the fourth aspect. The processor is configured to execute program code stored in the memory, to perform the information transmission method provided in the second aspect or the fourth aspect.

According to a tenth aspect, a communications system is provided. The communications system includes a terminal device and a network device.

The terminal device may be the terminal device described in the sixth aspect or the eighth aspect, or may be the network device described in the seventh aspect or the ninth aspect.

According to an eleventh aspect, an embodiment of the present invention provides a computer-readable storage medium. The readable storage medium stores an instruction. When the instruction is run on a computer, the computer is enabled to perform the information transmission method described in the first aspect or the third aspect.

According to a twelfth aspect, an embodiment of the present invention provides a computer-readable storage medium. The readable storage medium stores an instruction. When the instruction is run on a computer, the computer is enabled to perform the information transmission method described in the second aspect or the fourth aspect.

According to a thirteenth aspect, an embodiment of the present invention provides a computer program product including an instruction. When the computer program product runs on a computer, the computer is enabled to perform the information transmission method described in the first aspect or the third aspect.

According to a fourteenth aspect, an embodiment of the present invention provides a computer program product including an instruction. When the computer program product runs on a computer, the computer is enabled to perform the information transmission method described in the second aspect or the fourth aspect.

BRIEF DESCRIPTION OF DRAWINGS

To describe the technical solutions in the embodiments of this application or in the background more clearly, the following briefly describes the accompanying drawings required for describing the embodiments of this application or the background.

FIG. 2(a) to FIG. 2(f) are schematic diagrams of beam training processes in the embodiments of the present invention;

DESCRIPTION OF EMBODIMENTS

Terms used in implementations of this application are merely used to explain specific embodiments of this application, but are not intended to limit this application.

Figure 1:
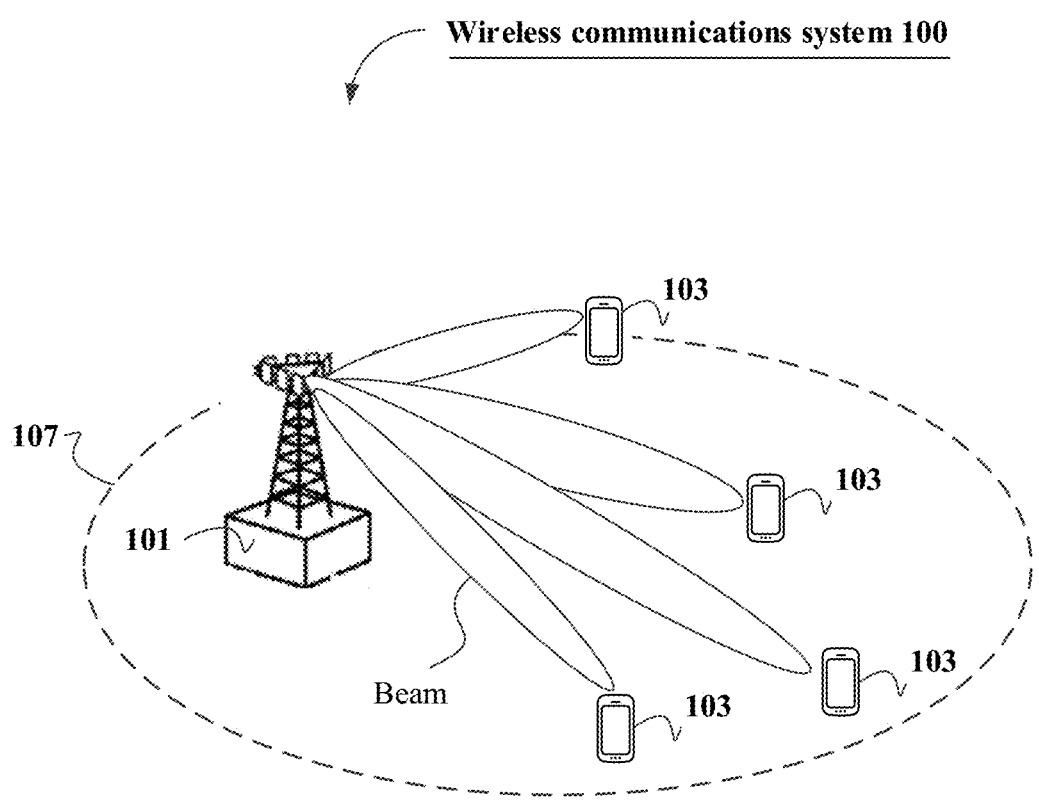
FIG. 1 is a schematic architectural diagram of a wireless communications system according to an embodiment of the present invention.

FIG. 1 shows a wireless communications system in the embodiments of the present invention. The wireless communications system may operate in a high frequency band. The wireless communications system is not limited to a long term evolution (LTE) system, and may be a future evolved fifth generation (5G) mobile communications system, a new radio (NR) system, a machine to machine (M2M) communications system, or the like. As shown in FIG. 1, the wireless communications system 100 may include one or more network devices 101, one or more terminal devices 103, and a core network (not shown).

The network device 101 may be a base station. The base station may be configured to communicate with one or more terminals, or may be configured to communicate with one or more base stations that have some terminal functions (for example, communication between a macro base station and a micro base station such as an access point). The base station may be a base transceiver station (BTS) in a time division synchronous code division multiple access (TD-SCDMA) system, an evolved NodeB (eNB) in an LTE system, or a base station in a 5G system or a new radio (NR) system. In addition, the base station may be an access point (AP), a transmission reception point (TRP), a central unit (CU), or another network entity, and may include a part of or all functions of the foregoing network entities.

The terminal devices 103 may be distributed in the entire wireless communications system 100, and may be static or mobile. In some embodiments of this application, the terminal device 103 may be a mobile device, a mobile station, a mobile unit, an M2M terminal, a radio unit, a remote unit, a terminal agent, a mobile client, or the like.

In the embodiments of the present invention, the wireless communications system 100 is a multi-beam communications system.

The network device 101 may be configured with a large-scale antenna array, and control, by using a beamforming technology, the antenna array to form beams having different directivity. To cover an entire cell 107, the network device 101 may use a plurality of beams having different directivity.

For example, in a downlink process, the network device 101 may transmit a radio signal (for example, a downlink reference signal (RS) and/or a downlink synchronization signal block (SS block) sequentially through beams having different directivity. This process is referred to as beam scanning. In addition, the terminal device 103 measures a transmit beam, and determines signal quality of the transmit beam that can be received by the terminal device 103. This process is referred to as beam measurement.

In a future communications system, the terminal device 103 may also be configured with an antenna array, and may change different beams to receive/send a signal. In other words, in the wireless communications system 100, both the network device 101 and the terminal device 103 may use a plurality of beams for communication.

For ease of differentiated descriptions, a network device transmit-receive beam may be referred to as a base station beam, including a base station transmit beam (or a base station sending beam) and a base station receive beam. A network device may have a plurality of base station transmit beams and a plurality of base station receive beams. A terminal device transmit-receive beam is referred to as a terminal beam, including a terminal transmit beam (or a terminal sending beam) and a terminal receive beam. A terminal device may have a plurality of terminal transmit beams and a plurality of terminal receive beams.

In one embodiment, beams may be classified into a network device transmit beam and a network device receive beam, and a terminal device transmit beam and a terminal device receive beam. The network device transmit beam is used to describe transmit-side beamforming information of the network device, and the base station receive beam is used to describe receive-side beamforming information of the network device. The terminal device transmit beam is used to describe transmit-side beamforming information of the terminal device, and the terminal receive beam is used to describe receive-side beamforming information of the terminal device. In other words, a beam is used to describe beamforming information.

In the embodiments of this application, the beam may correspond to a time resource or a spatial resource.

In one embodiment, the beam may also correspond to a reference signal resource (for example, a reference signal resource for beamforming) or beamforming information.

In one embodiment, the beam may also correspond to information associated with a reference signal resource of the network device. The reference signal may be a channel state information reference signal (CSI-RS), a synchronization signal block (SS block), a demodulation reference signal (DMRS), a phase tracking signal (PTRS), a tracking signal (TRS), or the like. The information associated with the reference signal resource may be a reference signal resource identifier, quasi co-location (QCL) assumption information, or the like.

The reference signal resource identifier corresponds to a transmit-receive beam pair that is previously established during measurement based on the reference signal resource. The terminal may infer beam information based on the reference signal resource index.

The following describes a beam training process in this application. As shown in FIG. 2(a) to FIG. 2(f), the beam training process may include the following operations:

(1) Select N best beam pairs (Beam pair link, BPL) (one BPL includes one base station transmit beam and one terminal receive beam, or one BPL includes one terminal transmit beam and one base station receive beam). This operation is used for a terminal device to select a base station transmit beam and/or a terminal receive beam based on beam scanning performed by a network device, and used for a network device to select a terminal transmit beam and/or a base station receive beam based on beam scanning of a terminal device, as shown in FIG. 2(a) and FIG. 2(b).

(2) Update a transmit beam. The transmit beam may be a base station transmit beam, or may be a terminal transmit beam. When the transmit beam is the base station transmit beam, as shown in FIG. 2(e), a base station sends reference signals to UE through different transmit beams; and the UE receives, through a same receive beam, the reference signals sent by the base station through the different transmit beams, determines a best base station transmit beam based on the received signals, and then feeds back the best base station transmit beam to the base station, so that the base station updates the transmit beam. When the transmit beam is the terminal transmit beam, as shown in FIG. 2(d), UE sends reference signals to a base station through different transmit beams; and the base station receives, through a same receive beam, the reference signals sent by the UE through the different transmit beams, determines a best UE transmit beam based on the received signals, and then feeds back the best UE transmit beam to the UE, so that the UE updates the transmit beam. The process of sending reference signals through different transmit beams may be referred to as beam scanning, and the process of determining a best transmit beam based on the received signal may be referred to as beam matching.

(3) Update a receive beam. The receive beam may be a base station receive beam, or may be a terminal receive beam. When the receive beam is the base station receive beam, as shown in FIG. 2(f), UE sends reference signals to a base station through a same transmit beam; and the base station receives, through different receive beams, the reference signals sent by the UE, and then determines a best base station receive beam based on the received signals, so that the base station updates the base station receive beam. When the receive beam is the UE receive beam, as shown in FIG. 2(c), a base station sends reference signals to the UE through a same transmit beam; and the UE receives, through different receive beams, the reference signals sent by the base station, and then determines a best UE receive beam based on the received signals, so that the UE updates the UE receive beam.

During downlink signal transmission, both the base station transmit beam and the terminal receive beam may dynamically change, and there may be a plurality of best receive beams determined by the terminal device based on the received signals. To enable the terminal device to determine a receive beam of the terminal device, the terminal device may feed back information about the plurality of receive beams to the network device, and the network device may indicate the terminal receive beam to the terminal device by sending beam indication information to the terminal device. When the terminal device uses analog beamforming, the terminal device may accurately determine the terminal receive beam based on the beam indication information sent by the network device. Therefore, a beam scanning time of the terminal device can be shortened, and power is saved.

A communication failure described in the embodiments of this application occurs in the following scenario: When the network device sends signaling and/or data to the terminal device through a transmit beam, because the transmit beam is blocked, a signal cannot continue to be transmitted, communication is interrupted, and the terminal device cannot normally receive signaling and/or data delivered by the network device.

To detect a link fault and recover a link, the network device may configure, for the terminal, a reference signal resource set (for example, Beam-Failure-Detection-RS-ResourceConfig, Beam-Failure-Detection-RS, or failureDetectionResources) used for communication failure detection and a reference signal resource set (candidatebeamRSList, Candidate-Beam-RS-Identification-Resource, beamFailure-CandidateBeamResource, or Candidate-Beam-Identification-RS) (which is also referred to as a candidate reference signal resource set) used for communication failure recovery. An RS in a beam failure detection RS set has a QCL relationship with a DMRS on a physical downlink control channel (PDCCH) or uses a transmission configuration indicator (TCI) state the same as that used on the PDCCH. When channel quality information (such as RSPR, RSRQ, a CQI, a BLER, an SINR, and an SNR) corresponding to a part of or all reference signals in the set is less than or equal to a preset threshold, it is determined that the communication failure occurs. That channel quality information is less than or equal to a preset threshold may be that the channel quality information is less than or equal to the preset threshold W consecutive times, or the channel quality information is less than or equal to the preset threshold W times within a particular time period, or the channel quality information is less than or equal to the preset threshold W of Z times. Optionally, the preset threshold may be the same as an OOS threshold for a radio link failure. In the embodiments of this application, the communication failure may also be referred to as a communication link fault, a communication link failure, a beam failure, a link fault, a link failure, a communication fault, or the like. In the embodiments of this application, these concepts have a same meaning. After the communication failure occurs, the terminal device may select, from the candidate reference signal resource set, a reference signal resource corresponding to channel quality information (such as RSPR, RSRQ, a CQI, a BLER, an SINR, and an SNR) greater than a preset threshold and that is used for communication failure recovery. That channel quality information is greater than the preset threshold may be that the channel quality information is greater than the preset threshold A consecutive times, or the channel quality information is greater than the preset threshold A times within a particular time period, or the channel quality information is greater than the preset threshold A of B times. In one embodiment, the preset threshold may be configured by the network device or predefined. Herein, a beam failure detection RS is used by the terminal to detect channel quality corresponding to a network device transmit beam, a downlink, or the PDCCH, and the transmit beam is a beam used by the network device to communicate with the terminal. A candidate beam identification RS is a reference signal set used by the terminal to initiate a communication failure recovery request after the terminal determines that a communication failure occurs on the network device transmit beam, the downlink, or the PDCCH. In one embodiment, the communication failure recovery may also be referred to as recovery of communication between the network device and the terminal device, link failure recovery, beam failure recovery, communication link failure recovery, link fault recovery, communication fault recovery, link reconfiguration, or the like. In a specific implementation, the two sets, the reference signal resource set used for communication failure detection and the reference signal resource set used for communication failure recovery, may also have other names. This is not limited in the embodiments of the present invention. In the embodiments of the present invention, communication failure recovery request information may also be referred to as link reconfiguration request information, communication link fault (or referred to as communication link failure, beam fault, beam failure, link fault, link failure, communication fault, or the like) recovery request information, reconfiguration request information, or the like.

In one embodiment, the beam failure may be a communication failure that occurs on a PDCCH on a control resource set.

Specifically, the communication failure recovery may also be understood as follows: The terminal device sends the communication failure recovery request information to the network device. After selecting a downlink reference signal used for the communication failure recovery, the terminal device reports the selected downlink reference signal to the network device. In one embodiment, two reporting methods may be included. One is an implicit reporting manner. After selecting the downlink reference signal (namely, a candidate reference signal resource) used for the communication failure recovery, the terminal device searches for and selects, based on a preset association relationship between a candidate reference signal resource and a physical random access channel (PRACH) resource, a PRACH resource associated with the downlink reference signal used for the communication failure recovery, and sends the communication failure recovery request by using the PRACH resource. After receiving the communication failure recovery request sent by the terminal device, the network device may learn, based on the PRACH resource carried in the communication failure recovery request and the preset association relationship between a candidate reference signal resource and a PRACH resource, which downlink reference signal/downlink reference signals is/are selected by the terminal device for the communication failure recovery. Alternatively, after selecting the downlink reference signal (namely, a candidate reference signal resource) used for the communication failure recovery, the terminal device searches for and selects, based on a preset association relationship between a candidate reference signal resource and a physical uplink control channel (PUCCH) resource, a PUCCH resource associated with the downlink reference signal used for the communication failure recovery, and sends the communication failure recovery request by using the PUCCH resource. After receiving the communication failure recovery request sent by the terminal device, the network device may learn, based on the PUCCH resource carried in the communication failure recovery request and the preset association relationship between a candidate reference signal resource and a PUCCH resource, which downlink reference signal/downlink reference signals is/are selected by the terminal device for the communication failure recovery. The other one is an explicit reporting manner. After selecting the downlink reference signal (namely, a candidate reference signal resource) used for the communication failure recovery, the terminal device sends the communication failure recovery request to the network device, where the communication failure recovery request carries information, for example, a reference signal resource index and reference signal channel quality, about the selected downlink reference signal used for the communication failure recovery. After receiving the communication failure recovery request sent by the terminal device, the network device may learn, based on the index, which downlink reference signal/downlink reference signals is/are selected by the terminal device for the communication failure recovery.

In one embodiment, TCI reconfiguration information may be configured for a PDCCH, and used to indicate QCL information of the PDCCH. Alternatively, the TCI reconfiguration information may be configured for a PDSCH, and used to indicate QCL information of the PDSCH. In the embodiments of the present invention, if the TCI state is configured for the PDCCH, the QCL information indicates that a DMRS on the PDCCH has a QCL relationship with a reference signal indicated by the TCI reconfiguration information. If the TCI state is configured for the PDSCH, the QCL information indicates that a DMRS on the PDSCH has a QCL relationship with a reference signal indicated by the TCI reconfiguration information. The TCI reconfiguration information includes one or more TCI states, and one TCI state indicates one piece of QCL information.

The network device notifies the QCL relationship of the PDCCH, to indicate which receive beam is used by the terminal device to receive the PDCCH. In a current standard, it is specified that the QCL relationship of the PDCCH is notified by using semi-static signaling of radio resource control (RRC) and/or a media access control (MAC) control element (CE).

In one embodiment, a communication failure recovery response time window may be referred to as a Beam-failure-Recovery-Response-CORESET.

In one embodiment, communication failure recovery response information is response information sent by the network device to the terminal device in response to the communication failure recovery request information.

Figure 3:
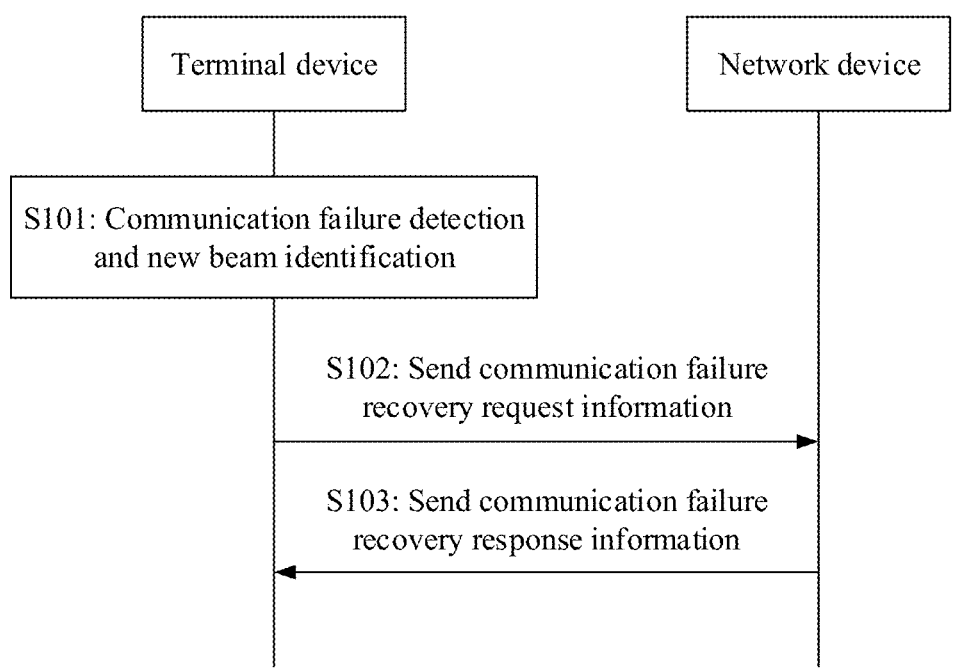
FIG. 3 is a schematic flowchart of communication failure detection and communication failure recovery in the prior art.

FIG. 3 shows a communication failure detection method and a communication failure recovery method in the prior art. As shown in FIG. 3, the methods include the following operations.

S101: A terminal device performs communication failure detection and new beam identification.

New beam identification described in an embodiment of the present invention may mean that the terminal device selects, from a candidate reference signal resource set, a reference signal resource corresponding to channel quality information (such as RSPR, RSRQ, a CQI, a BLER, an SINR, and an SNR) greater than a preset threshold and that is used for communication link recovery. It should be noted that an execution sequence of the two steps of performing communication failure detection by the terminal device and performing new beam identification by the terminal device is not limited. The terminal device may perform the communication failure detection before the terminal device performs the new beam identification, or the terminal device may perform the communication failure detection after the terminal device performs the new beam identification, or the terminal device may perform the communication failure detection when the terminal device performs the new beam identification.

In one embodiment, a communication failure may occur when quality of a beam used by a network device to send a PDCCH and quality of a beam used by the terminal device to receive the PDCCH are reduced enough low. In other words, the communication failure occurs when quality of a beam pair (Beam Pair Link, BPL) used to send and receive the PDCCH is reduced enough low. Alternatively, when quality of a reference signal used for the communication failure detection is less than or equal to a preset threshold, it is considered that the communication failure occurs. A reason for the communication failure includes but is not limited to the following: In a communication process, an obstacle exists, and a diffraction capability on a high frequency channel is poor. Consequently, a currently serving beam is blocked, and a signal cannot continue to be transmitted. As described above, that signal quality deteriorates may be that the channel quality information (such as RSPR, RSRQ, a CQI, a BLER, an SINR, and an SNR) is less than or equal to the preset threshold.

After the communication failure occurs, the terminal device continues to detect a downlink reference signal (or referred to as a candidate reference signal set) delivered by the network device, and measures signal quality of the downlink reference signal, to identify (or select) a downlink reference signal corresponding to good channel quality/ signal quality. Identifying the downlink reference signal corresponding to good channel quality/signal quality means that a downlink beam corresponding to good channel quality is identified. The downlink beam corresponding to good channel quality means that channel quality information (such as RSPR, RSRQ, a CQI, a BLER, an SINR, and an SNR) corresponding to the downlink reference signal sent by the network device is greater than the preset threshold. Alternatively, the terminal device continuously measures channel quality corresponding to downlink reference signals sent by a plurality of network devices. If a downlink reference signal has the best channel quality in the plurality of downlink reference signals, a beam corresponding to the downlink reference signal corresponding to the best channel quality is the identified beam corresponding to good channel quality. Herein, the network device may send downlink reference signals through a plurality of transmit beams, respectively. In this case, the terminal device measures channel quality corresponding to the plurality of transmit beams by using the downlink reference signals respectively sent by the network device through the plurality of transmit beams, to select a downlink reference signal corresponding to good channel quality. In one embodiment of the present invention, the beam corresponding to good channel quality may have the same meaning as the downlink reference signal corresponding to good channel quality/signal quality. That channel quality information is greater than the preset threshold may be that the channel quality information is greater than the preset threshold A times, or the channel quality information is greater than the preset threshold A consecutive times, or the channel quality information is greater than the preset threshold A consecutive times within a time period, or the channel quality information is greater than the preset threshold A of B times.

It may be understood that because the selected base station transmit beam has good quality, it indicates that a terminal device receive beam corresponding to the base station transmit beam also has good quality. In one embodiment, when a UE receive beam and a UE transmit beam have reciprocity, it indicates that a terminal device transmit beam corresponding to the terminal device receive beam also has good quality.

S102: The terminal device sends communication failure recovery request information to the network device.

The communication failure recovery request information sent by the terminal device to the network device is used to initiate link reconfiguration, namely, used to indicate a link failure or a communication failure.

Herein, the terminal device identifies the downlink beam corresponding to good quality, where the downlink beam includes the base station transmit beam and/or the terminal device receive beam. In a scenario in which beam reciprocity exists, there is a correspondence between a terminal device receive beam and a terminal device transmit beam. In this case, the terminal device may send the link reconfiguration request through the newly identified terminal device receive beam. In a scenario in which beam reciprocity does not exist, the terminal device may send the link reconfiguration request information through another transmit beam.

In the scenario in which the beam reciprocity exists, each terminal device receive beam corresponds to one terminal device transmit beam. Herein, that the terminal device receive beam corresponds to the terminal device transmit beam means that the terminal device receive beam and the terminal device transmit beam have same directivity. In one embodiment, the terminal device receive beam and the terminal device transmit beam corresponding to the terminal device receive beam may be a same beam, and may belong to a same transceiver apparatus. In one embodiment, an antenna port corresponding to the terminal device receive beam and an antenna port corresponding to the terminal device transmit beam corresponding to the terminal device receive beam may be quasi co-located (QCL). In one embodiment, quasi co-location means that the antenna ports have at least one same parameter in the following parameters or have a determined correspondence in terms of at least one of the following parameters: an angle of arrival AoA (angle of arrival), a dominant angle of arrival Dominant AoA, an average angle of arrival, a power angular spectrum of an angle of arrival (power angular spectrum (PAS) of AoA), an angle of departure AoD (angle of departure), a dominant angle of departure, an average angle of departure, a power angular spectrum of an angle of departure, terminal device transmit beamforming, terminal device receive beamforming, a spatial channel correlation, base station transmit beamforming, base station receive beamforming, an average channel gain, an average channel delay, a delay spread, a Doppler spread Doppler spread, a spatial receive parameter (spatial Rx parameters), and the like.

S103: The network device receives the communication failure recovery request information sent by the terminal device, and the network device sends communication failure recovery response information to the terminal.

Herein, the communication failure recovery response information is response information sent by the network device to the terminal device in response to the communication failure recovery request information.

S104: The terminal device receives the communication failure recovery response information sent by the network device.

In one embodiment, after the terminal device receives the communication failure recovery response information sent by the network device, the terminal device may perform beam measurement.

In one embodiment, the terminal device receives downlink reference signals sent by the network device through different transmit beams, to measure channel quality corresponding to the different transmit beams. The network device also configures, for the terminal device, a dedicated CORESET, namely, a second CORESET shown in FIG. 3. The dedicated CORESET is used for downlink communication after a link failure occurs, and mainly used by the network device to send the communication failure recovery response information.

In one embodiment, after performing the beam measurement, the terminal device may further report beam quality, and the network device receives the beam quality reported by the terminal device.

In one embodiment, through beam training, the terminal device measures channel quality corresponding to a plurality of base station transmit beams, selects J (where J is a positive integer greater than or equal to 1) best base station transmit beams from the plurality of based station transmit beams, and reports channel quality corresponding to the beams. To be specific, the terminal device measures channel quality corresponding to a plurality of downlink reference signals sent by the base station, and selects J best downlink reference signals from the plurality of downlink reference signals for reporting. Herein, the base station transmit beam corresponding to best channel quality means that channel quality information (such as RSPR, RSRQ, a CQI, a BLER, an SINR, and an SNR) corresponding to the base station transmit beam is greater than the preset threshold. Alternatively, the terminal device continuously measures the channel quality corresponding to the plurality of base station transmit beams, and a base station transmit beam has the best channel quality in the plurality of base station transmit beams.

After receiving the channel quality corresponding to the beams reported by the terminal device, the network device may reconfigure, for the terminal device by using radio resource control (RRC) signaling, MAC CE signaling, or downlink control information (DCI), QCL information used to detect the PDCCH. In other words, the network device re-determines which receive beam is to be used by the terminal device to detect the PDCCH.

Figure 4:
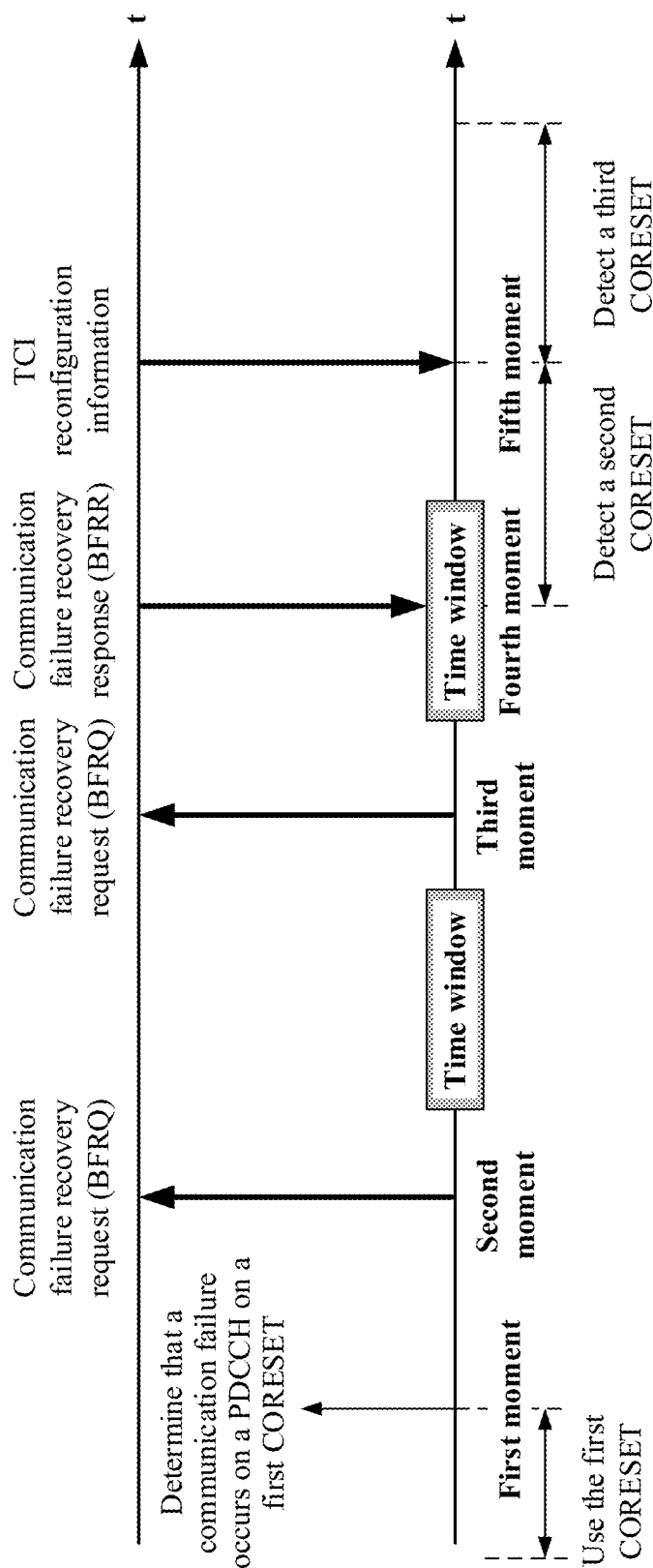
FIG. 4 is a schematic diagram of detecting, by a terminal device, different CORESETs in different time periods.

Based on the communication failure detection method and the communication failure recovery method in the prior art shown in FIG. 3, FIG. 4 is a schematic diagram of detecting, by a terminal device, different CORESETs in different time periods in the prior art. As shown in FIG. 4, specific descriptions of the process at moments are represented as follows:

At a first moment, the terminal device determines that a communication failure occurs on a PDCCH on a first CORESET.

At a second moment, the terminal device sends communication failure recovery request information to the network device for the first time after the first moment.

At a third moment (optionally), the terminal device sends the communication failure recovery request information to the network device for the i$^{th}$ time (where i is a positive integer greater than 1) after the first moment. FIG. 4 shows an example description by using an example in which the terminal device sends the communication failure recovery request information twice. In actual application, if the terminal device does not receive a communication failure recovery response before a specified time or a specified quantity of times is reached, the terminal device may continuously send the communication failure recovery request information.

At a fourth moment, the terminal device receives communication failure recovery response information sent by the network device. It should be noted that the terminal device detects the communication failure recovery response information within a communication failure recovery response time window.

At a fifth moment, the terminal device receives TCI reconfiguration information sent by the network device. It should be noted that the moment at which the terminal device receives the TCI reconfiguration information may also fall within the communication failure recovery response time window. The communication failure recovery response time window is used to detect the communication failure recovery response information.

In FIG. 4, BFRQ is an abbreviation of beam failure recovery request, and BFRR is an abbreviation of beam failure recovery response. The first CORESET is a CORESET on which the communication failure (namely, a beam failure) occurs. A second CORESET is a CORESET resource specially configured for communication failure recovery. After learning that the communication failure occurs on the first CORESET, the network device returns the communication failure recovery response information to the terminal device by using the second CORESET. A third CORESET is a new CORESET resource used after the communication failure recovery. The third CORESET may be the first CORESET resource for which QCL information is reconfigured (in other words, a terminal device receive beam is reconfigured), or a newly configured CORESET resource and newly configured QCL information (in other words, time-frequency resource information and a terminal device receive beam are reconfigured for the PDCCH). The TCI reconfiguration information is used to indicate the third CORESET. In FIG. 4, the BFRR is to be detected within the BFRR window, namely, a time window shown in FIG. 4.

As shown in FIG. 4, in the prior art, the terminal device is restricted to detecting the second CORESET within the BFRR window. In other words, the terminal device detects, within the BFRR window such as a BFRR window shown as a gray box in FIG. 4, the BFRR sent by the network device. The terminal device detects the second CORESET within the time period from a moment for receiving the BFRR to a moment for receiving the reconfigured TCI information, for example, a moment for receiving the BFRR to a moment for receiving the TCI reconfiguration in FIG. 4. After receiving the reconfigured TCI information, the terminal device uses the newly configured TCI information to detect a newly configured CORESET or a CORESET on which a beam failure occurs (namely, the first CORESET in FIG. 4). For example, the BFRQ to the BFRR window is usually four slots (slot). After the communication failure occurs, namely, after the first moment, the terminal device may select, from the candidate reference signal resource set, a downlink reference signal resource corresponding to channel quality information (such as RSPR, RSRQ, a CQI, a BLER, an SINR, and an SNR) greater than the preset threshold and that is used for the communication failure recovery. In the prior art, before receiving the beam failure recovery response, the terminal device cannot determine whether the newly identified downlink reference signal resource corresponding to channel quality information greater than the preset threshold can be used for communication. In a time period from a moment at which the beam failure occurs to the moment for receiving the beam failure recovery response, if the terminal device cannot learn a link status (whether communication can be performed) of the first CORESET on which the communication failure occurs, robustness of a system is relatively poor. When the obstacle disappears, the UE needs to continue to rely on the network device to recover a link. Consequently, the link cannot be rapidly recovered for normal communication.

Figure 5:
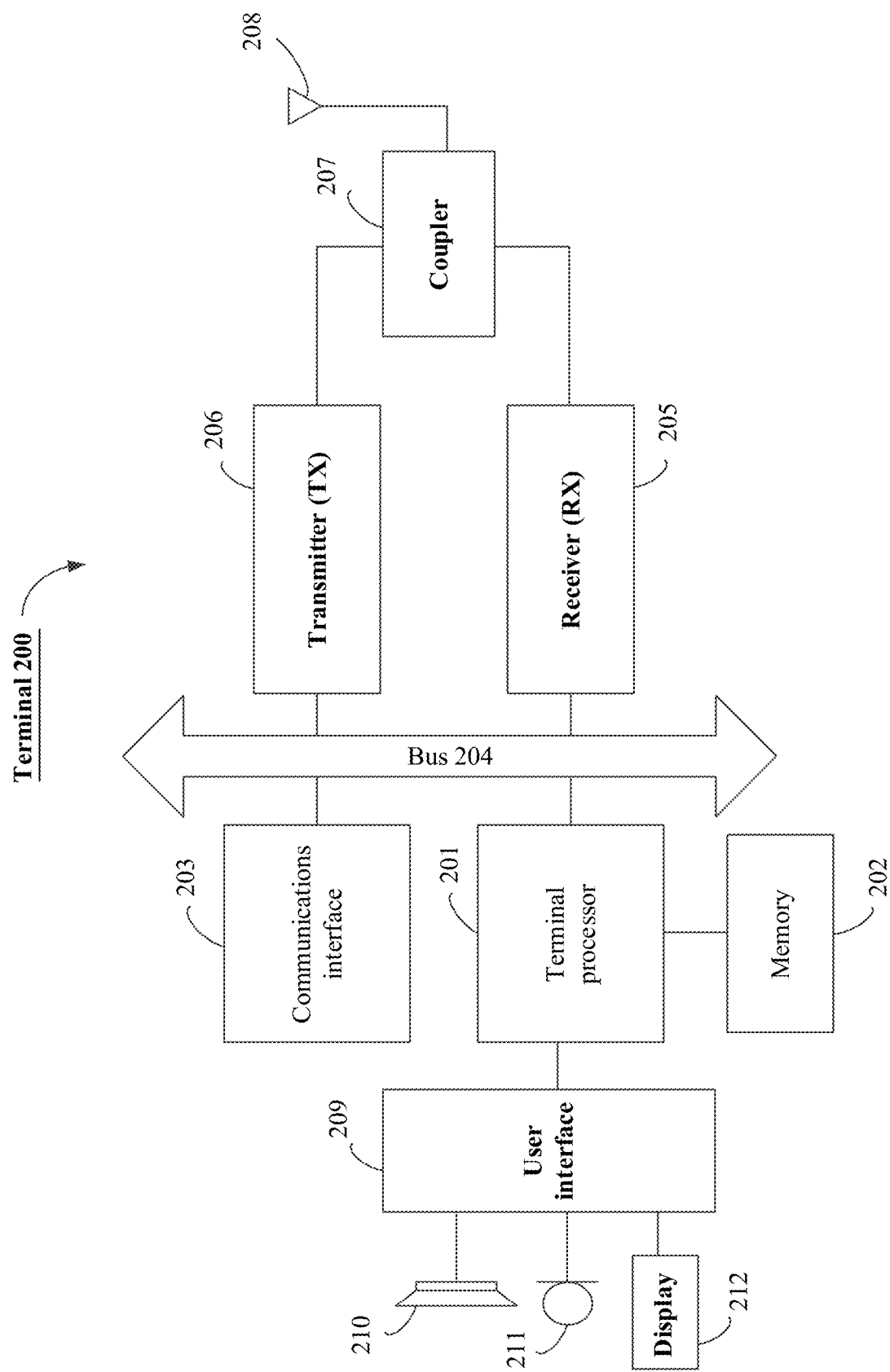
FIG. 5 is a schematic diagram of a hardware architecture of a terminal device according to an embodiment of the present invention.

FIG. 5 shows a terminal device 200 according to an embodiment of the present invention. As shown in FIG. 5, the terminal device 200 may include: one or more terminal device processors 201, memories 202, communications interfaces 203, receivers 205, transmitters 206, couplers 207, antennas 208, terminal device interfaces 202, and input/output modules (including an audio input/output module 210, a key input module 211, a display 212, and the like). These components may be connected via a bus 204 or in another manner. In FIG. 5, that the components are connected via a bus is used as an example.

The communications interface 203 may be used by the terminal device 200 to communicate with another communications device, for example, a network device. Specifically, the network device may be a network device 300 shown in FIG. 5. Specifically, the communications interface 203 may be a long term evolution (LTE) (4G) communications interface, a 5G communications interface, or a future new radio communications interface. In addition to a wireless communications interface, the terminal device 200 may further be configured with a wired communications interface 203, for example, a local access network (LAN) interface.

The transmitter 206 may be configured to perform transmission processing on a signal output by the terminal device processor 201, for example, implement directional sending through beamforming. The receiver 205 may be configured to perform receiving processing on a mobile communication signal received by the antenna 208, for example, implement directional receiving through beamforming. In some embodiments of this application, the transmitter 305/receiver 306 may include a beamforming controller, configured to control directional sending/receiving of a signal by multiplying a transmitted signal/a received signal by weight vectors W1, . . . , and Wm. Base station beam switching mentioned in the embodiments of the present invention may be implemented by the beamforming controller in the transmitter 305/receiver 306 by changing the weight vectors and by multiplying the transmitted signal/the received signal by the weight vectors.

In some embodiments of this application, the transmitter 206 and the receiver 205 may be considered as a wireless modem. The terminal device 200 may include one or more transmitters 206 and one or more receivers 205. The antenna 208 may be configured to convert electromagnetic energy in a transmission line into an electromagnetic wave in free space, or convert an electromagnetic wave in free space into electromagnetic energy in a transmission line. The coupler 207 is configured to: divide the mobile communication signal received by the antenna 208 into a plurality of signals, and distribute the plurality of signals to a plurality of receivers 205.

In addition to the transmitter 206 and the receiver 205 shown in FIG. 5, the terminal device 200 may further include other communications components such as a GPS module, a Bluetooth (Bluetooth) module, and a wireless fidelity (Wi-Fi) module. In addition to the foregoing wireless communication signal, the terminal device 200 may further support another wireless communication signal such as a satellite signal or a short-wave signal. In addition to wireless communication, the terminal device 200 may further be configured with a wired network interface (for example, the LAN interface) to support wired communication.

The input/output module may be configured to implement interaction between the terminal device 200 and a terminal device/an external environment, and may mainly include the audio input/output module 210, the key input module 211, the display 212, and the like. Specifically, the input/output module may further include a camera, a touchscreen, a sensor, and the like. The input/output module communicates with the terminal device processor 201 through the terminal device interface 209.

The memory 202 is coupled to the terminal device processor 201, and is configured to store various software programs and/or a plurality of groups of instructions. In one embodiment, the memory 202 may include a high-speed random access memory, and may further include a non-volatile memory, for example, one or more disk storage devices, flash memory devices, or other non-volatile solid-state storage devices. The memory 202 may store an operating system (which is referred to as a system below), for example, an embedded operating system such as ANDROID, iOS, WINDOWS, or LINUX. The memory 202 may further store a network communication program. The network communication program may be used to communicate with one or more additional devices, terminal devices, and network devices. The memory 202 may further store a terminal device interface program. The terminal device interface program may vividly display content of an application program via a graphical operation interface, and receive, via an input control such as a menu, a dialog box, or a key, a control operation performed by the terminal device on the application program.

In some embodiments of this application, the memory 202 may be configured to store a program for implementing, on the terminal device side 200, a signal transmission method provided in one or more embodiments of this application. For an implementation of the signal transmission method provided in one or more embodiments of this application, refer to the following embodiments.

The terminal device processor 201 may be configured to read a computer-readable instruction and execute the computer-readable instruction. In one embodiment, the terminal device processor 201 may be configured to: invoke a program stored in the memory 212, for example, the program for implementing, on the terminal device side 200, the signal transmission method provided in one or more embodiments of this application, and execute an instruction included in the program.

It may be understood that the terminal device 200 may be the terminal device 103 in the wireless communications system 100 shown in FIG. 1, and may be implemented as a mobile device, a mobile station (mobile station), a mobile unit (mobile unit), a wireless unit, a remote unit, a terminal device agent, a mobile client, or the like.

It should be noted that the terminal device 200 shown in FIG. 5 is merely an implementation of this embodiment of this application. In an actual application, the terminal device 200 may further include more or fewer components. This is not limited herein.

Figure 6:
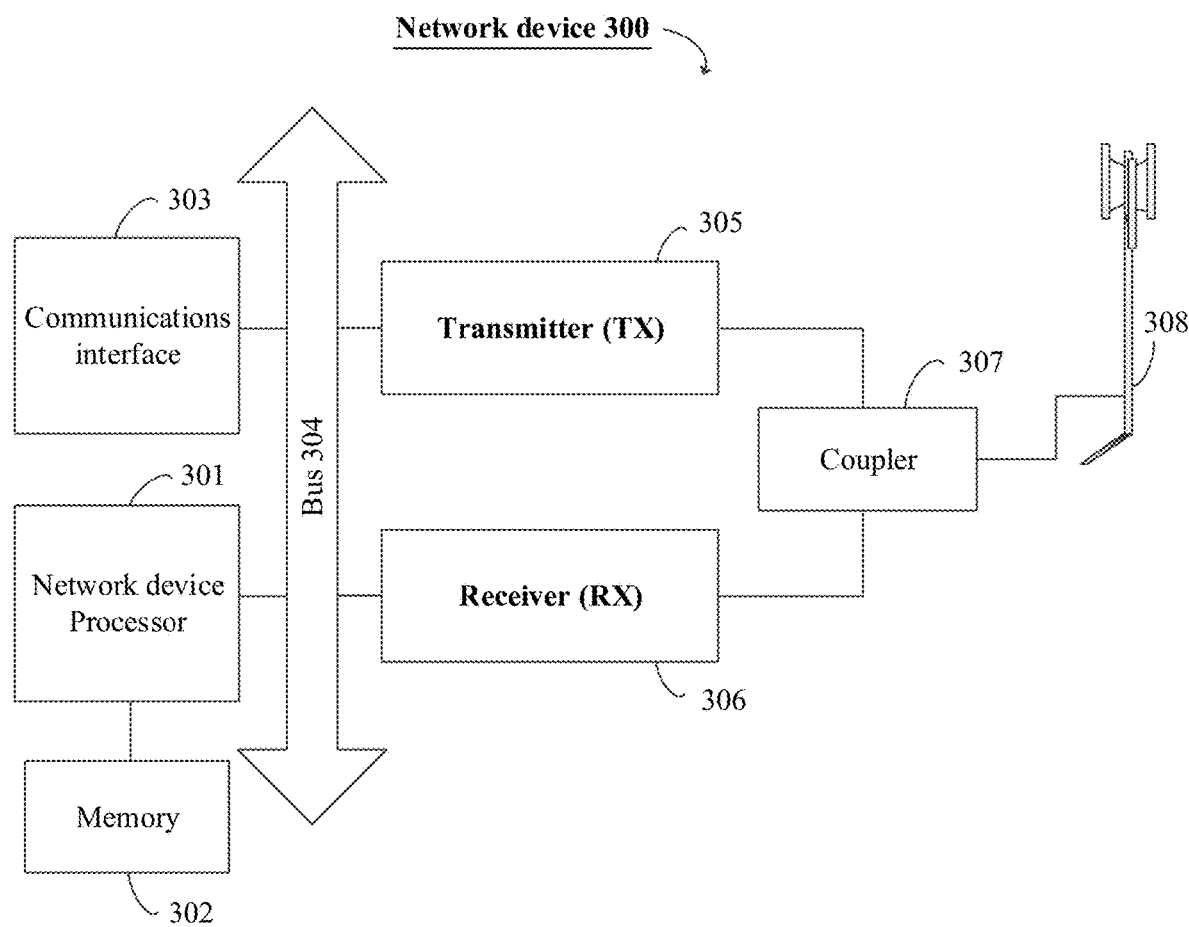
FIG. 6 is a schematic diagram of a hardware architecture of a network device according to an embodiment of the present invention.

FIG. 6 shows a network device 300 according to an embodiment of the present invention. As shown in FIG. 6, the network device 300 may include: one or more network device processors 301, memories 302, communications interfaces 303, transmitters 305, receivers 306, couplers 307, and antennas 308. These components may be connected via a bus 304 or in another manner. In FIG. 6, that the components are connected via a bus is used as an example.

The communications interface 303 may be used by the network device 300 to communicate with another communications device, for example, a terminal device or another network device. In one embodiment, the terminal device may be the terminal device 200 shown in FIG. 4. Specifically, the communications interface 303 and the communications interface 203 may be a long term evolution (LTE) (4G) communications interface, a 5G communications interface, or a future new radio communications interface. In addition to a wireless communications interface, the network device 300 may further be configured with a wired communications interface 303 to support wired communication. For example, a backhaul connection between a network device 300 and another network device 300 may be a wired communication connection.

The transmitter 305 may be configured to perform transmission processing on a signal output by the network device processor 301, for example, implement directional sending through beamforming. The receiver 306 may be configured to perform receiving processing on a mobile communication signal received by the antenna 308, for example, implement directional receiving through beamforming. In some embodiments of this application, the transmitter 305/receiver 306 may include a beamforming controller, configured to control directional sending/receiving of a signal by multiplying a transmitted signal/a received signal by weight vectors W'1, . . . , and W'm. Base station beam switching mentioned in this application may be implemented by the beamforming controller in the transmitter 305/receiver 306 by changing the weight vectors and by multiplying the transmitted signal/the received signal by the weight vectors.

In some embodiments of this application, the transmitter 305 and the receiver 306 may be considered as a wireless modem. The network device 300 may include one or more transmitters 305 and one or more receivers 306. The antenna 308 may be configured to convert electromagnetic energy in a transmission line into an electromagnetic wave in free space, or convert an electromagnetic wave in free space into electromagnetic energy in a transmission line. The coupler 307 may be configured to: divide the mobile communication signal into a plurality of signals, and distribute the plurality of signals to a plurality of receivers 306.

The memory 302 is coupled to the network device processor 301, and is configured to store various software programs and/or a plurality of groups of instructions. Specifically, the memory 302 may include a high-speed random access memory, and may further include a non-volatile memory, for example, one or more disk storage devices, flash memory devices, or other non-volatile solid-state storage devices. The memory 302 may store an operating system (which is referred to as a system below), for example, an embedded operating system such as uCOS, VxWorks, or RTLinux. The memory 302 may further store a network communication program. The network communication program may be used to communicate with one or more additional devices, terminal devices, and network devices.

The network device processor 301 may be configured to: manage a radio channel, implement a call, establish and remove a communication link, and provide cell handover control for a terminal device in a local control region. In one embodiment, the network device processor 301 may include an administration module/communication module (AM/CM) (a center for speech channel switching and information exchange), a basic module (Basic Module, BM) (configured to perform call processing, signaling processing, radio resource management, radio link management, and circuit maintenance functions), a transcoder and submultiplexer (TCSM) (configured to perform multiplexing/demultiplexing and transcoding functions), and the like.

In the embodiments of the present invention, the network device processor 301 may be configured to read a computer-readable instruction and execute the computer-readable instruction. Specifically, the network device processor 301 may be configured to: invoke a program stored in the memory 302, for example, the program for implementing, on the network device side 300, a signal transmission method provided in one or more embodiments of this application, and execute an instruction included in the program.

It may be understood that the network device 300 may be the network device 101 in the wireless communications system 100 shown in FIG. 1, and may be implemented as a base transceiver station, a wireless transceiver, a basic service set (BSS), an extended service set (ESS), a NodeB, an eNodeB, an access point, a TRP, or the like.

It should be noted that the network device 300 shown in FIG. 6 is merely an implementation of this embodiment of this application. In actual application, the network device 300 may further include more or fewer components. This is not limited herein.

Based on the foregoing embodiments corresponding to the wireless communications system 100, the terminal device 200, and the network device 300, this application provides an information transmission method.

First, basic concepts in this application are described.

(1) Quasi Co-Location (QCL) Information

The QCL information may include at least one of a beam group index number of a reference signal, a reference signal resource index number, a port number of the reference signal, and a port group number of the reference signal. Herein, the beam group index number of the reference signal is equivalent to a resource set index number of the reference signal. The reference signal resource index number may be a relative index number that is based on a set of a plurality of resource index numbers. For example, if a terminal device reports four absolute resource index numbers {1, 5, 7, 9} of the reference signal, based on the report result of the terminal device, a relative resource index number of the reference signal is any one of {0, 1, 2, 3}. The relative resource index number 0 corresponds to the reference signal resource index number 1 reported by the terminal device, the relative resource index number 1 corresponds to the reference signal resource index number 5 reported by the terminal device, the relative resource index number 2 corresponds to the reference signal resource index number 7 reported by the terminal device, and the relative resource index number 3 corresponds to the reference signal resource index number 9 reported by the terminal device.

By way of example, and not limitation, for example, a network device may indicate that a demodulation reference signal (DMRS) on a PDSCH or a PDCCH has a QCL relationship with one or more of a plurality of reference signal resources previously reported by the terminal device. For example, the reference signal may be a channel state information reference signal (CSI-RS). Herein, each reported CSI-RS resource index corresponds to one transmit-receive beam pair that is previously established during measurement based on the CSI-RS resource. It should be understood that, receive beam information of two reference signals or channels that have a QCL relationship with each other is the same. Therefore, based on the reference signal resource index, the terminal device may infer a receive beam for receiving the PDSCH or the PDCCH. The foregoing reference signal may be a CSI-RS, an SS block, or another reference signal. A specific type of the reference signal is not limited in the embodiments of this application.

In one embodiment, the QCL information may also include some spatial characteristic parameters, such as an azimuth angle of departure (AoD), a zenith angle of departure (ZoD), an azimuth angle spread of departure (ASD), a zenith angle spread of departure (ZSD), and parameters related to an angle of arrival, such as an azimuth angle of arrival (AoA), a zenith angle of departure (ZoA), an azimuth angle spread of arrival (ASA), and a zenith angle spread of arrival (ZSA). These spatial characteristic parameters describe spatial channel characteristics between antenna ports between reference signals. This helps the terminal device complete a receiver-side beamforming process or a receiving processing process based on the QCL information.

In one embodiment, the QCL information may further include a spatial receive parameter (Spatial Rx parameter). In addition, the QCL information further includes but is not limited to at least one of the following parameters: a delay spread, a Doppler spread, a Doppler frequency shift, an average gain, and an average delay. In one embodiment, the spatial characteristic parameter included in the QCL information may be another parameter other than the foregoing parameters. This is not limited herein. To reduce overheads caused by a QCL indication from the network device to the terminal device, in a candidate existing technology, it is specified, based on the QCL indication sent by the network device to the terminal device, that one of S (where S is a positive integer greater than or equal to 1) transmit-receive beam pairs previously measured based on a channel state information reference signal (CSI-RS) and reported by the terminal device meets a QCL relationship. In other words, a receive beam for a modulation reference signal (DMRS) of current data is the same as one receive beam in M transmit-receive beam pairs previously measured based on CSI-RSs and reported by the terminal device. For example, the terminal device measures CSI-RSs corresponding to a plurality of beams sent by the network device, to select several best beams, for example, four beams, and reports measurement information of the four best beams to the network device. Beam measurement information is beam status information (BSI), and mainly includes a reference signal resource index and reference signal received power (RSRP) of a beam. The QCL indication sent by the network device to the terminal device indicates that a third CSI-RS in the four transmit-receive beam pairs previously measured based on CSI-RSs and reported by the terminal device meets a QCL relationship. In this case, the terminal device uses a receive beam corresponding to the third CSI-RS to receive the PDSCH delivered by the network device.

(2) Control Resource Set (CORESET)

Figure 7:
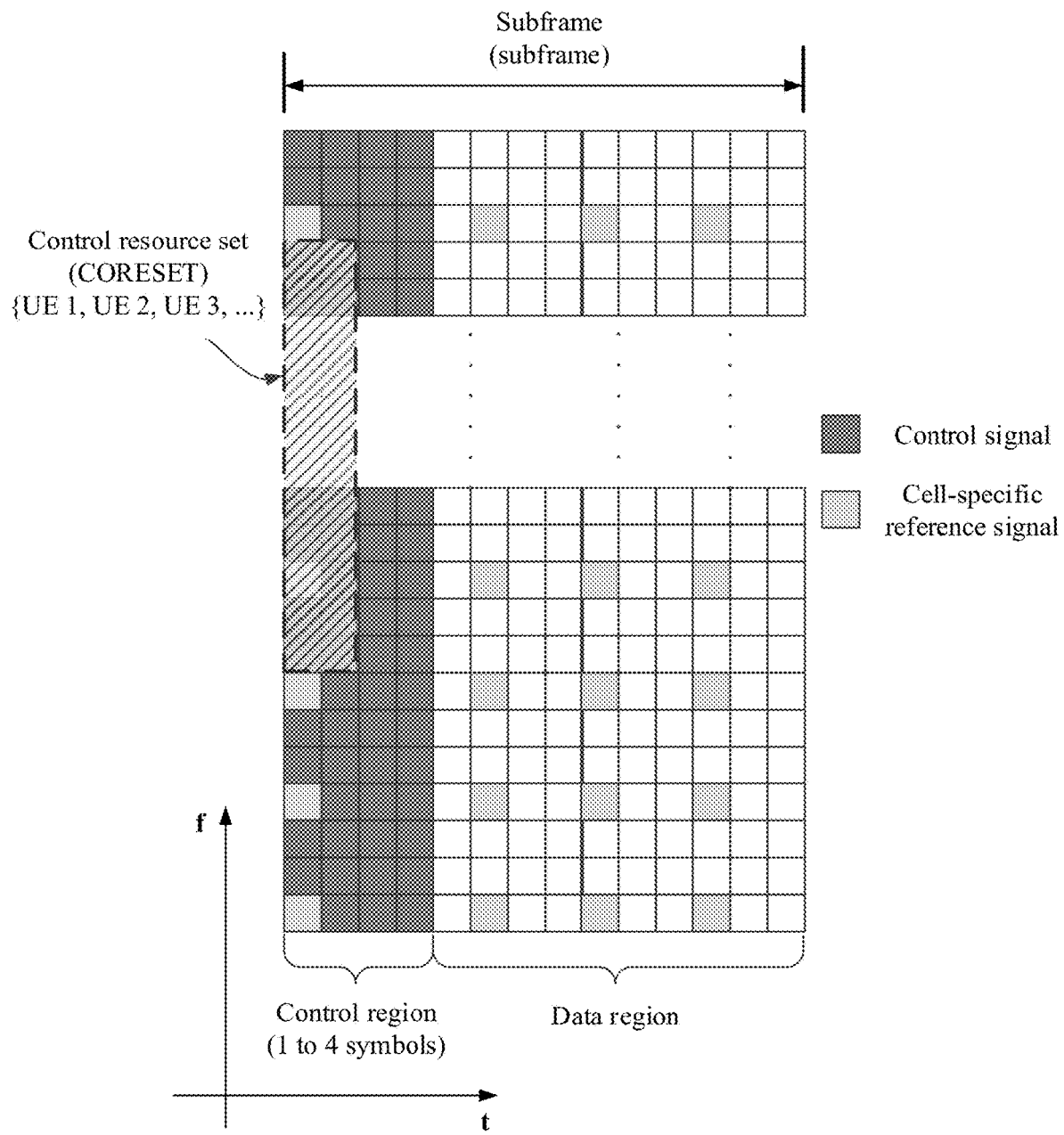
FIG. 7 is a schematic diagram of a control resource set according to an embodiment of the present invention.

As shown in FIG. 7, one CORESET is one time-frequency resource in a control region. In FIG. 7, first four time domain symbols in 14 time domain symbols are in the control region, and only a part of resources in the first four time domain symbols may be defined as a resource corresponding to a CORESET. One CORESET corresponds to one group of users (such as UE 1, UE 2, and UE 3). A physical downlink control channel (PDCCH) corresponding to the group of users is sent on the CORESET. On one CORESET, each user corresponds to one search space (search space), and a size of a resource in the search space is less than or equal to a size of a resource in the CORESET. One user may correspond to a plurality of CORESETs. Numerologies associated with the CORESETs may be the same or different. The numerologies herein may include a subcarrier spacing and a cyclic prefix (CP) length.

Figure 8:
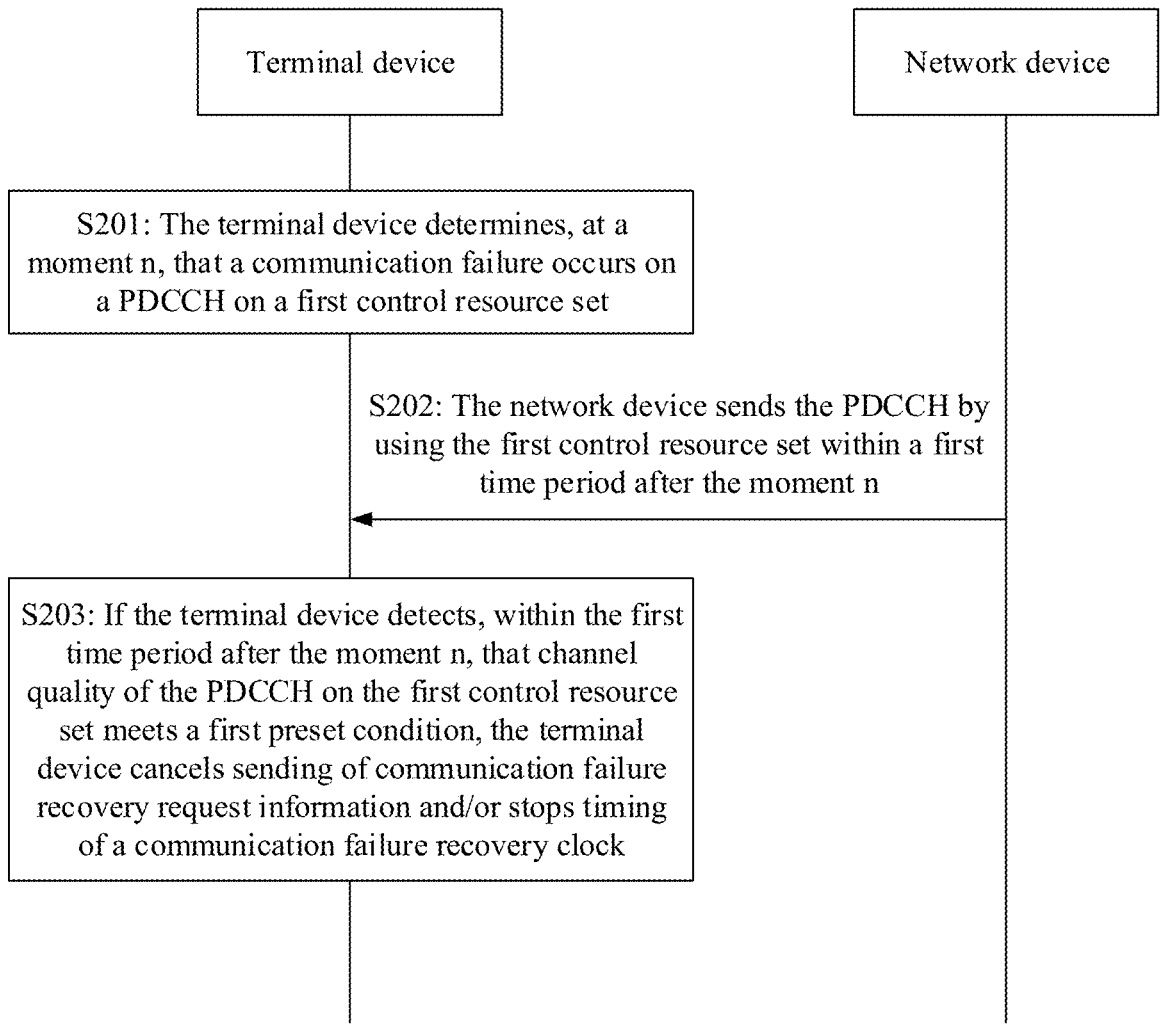
FIG. 8 is a schematic flowchart of an information transmission method according to an embodiment of the present invention.

Then, FIG. 8 is a general schematic flowchart of an information transmission method according to an embodiment of the present invention. In this embodiment of the present invention, the following is mainly discussed: Within a time period after a link failure occurring on a PDCCH on a first CORESET and before receiving, by a terminal device, communication failure recovery response information returned by a network device, if the terminal device detects that the PDCCH on the first CORESET meets a first preset condition, the terminal device cancels a communication failure recovery process, and continues to use, for communication, the first CORESET on which a communication failure has occurred previously and that is recovered from the failure currently. In this way, a communication link is rapidly recovered, and robustness of a communications system is improved. As shown in FIG. 8, the information transmission method provided in this embodiment of the present invention may include the following operations.

S201: The terminal device determines, at a moment n, that a communication failure occurs on the PDCCH on the first control resource set, where the moment n is a moment at which the communication failure that occurs on the PDCCH on the first control resource set is determined.

In this embodiment of the present invention, the network device configures, for the terminal, a reference signal resource set used for communication failure detection, and the terminal device can determine, by identifying the reference signal resource set, whether the communication failure occurs on the PDCCH on the first control resource set. When channel quality information (such as reference signal received power (RSRP), reference signal received quality (RSRQ), a block error rate (BLER), a signal to interference plus noise ratio (SINR), and a signal-to-noise ratio (SNR), where the BLER may be a hypothetical PDCCH BLER, that is, a hypothetical PDCCH BLER) corresponding to a part of or all reference signals in the reference signal resource set is less than or equal to a preset threshold, it is determined that the communication failure occurs. That channel quality information is less than or equal to a preset threshold may be that the channel quality information is less than or equal to the preset threshold W consecutive times, or the channel quality information is less than or equal to the preset threshold W times within a particular time period, or the channel quality information is less than or equal to the preset threshold W of Z times. Optionally, the preset threshold may be the same as an OOS threshold for a radio link failure. For ease of description, in this embodiment of the present invention, the reference signal resource set used for the communication failure detection is referred to as a second reference signal.

It should be noted that the PDCCH is merely used as an example. In an actual application, a channel on which the terminal device determines, at the moment n, that a communication failure occurs may be a downlink control channel other than the PDCCH. This is not limited in this application.

The moment n may be equivalent to the first moment shown in FIG. 4.

In one embodiment, the first control resource set includes one or more control resource sets.

In one embodiment, the first control resource set is a CORESET, a control region, or an ePDCCH set.

In one embodiment, that the communication failure occurs on the PDCCH on the first control resource set is specifically: the second reference signal corresponding to the first control resource set is less than or equal to a preset threshold Q consecutive times, where Q starts be counted when a reference signal corresponding to a maximum periodicity in the second reference signal is less than or equal to the preset threshold, and the second reference signal is used to determine that the communication failure occurs on the PDCCH on the first control resource set. Herein, the preset threshold may be the same as a radio link failure (radio link failure) OOS threshold.

Herein, the second reference signal corresponding to the first control resource set may be used to determine whether the communication failure occurs on the PDCCH on the first control resource set. Specifically, the second reference signal is a reference signal resource set used for the communication failure detection. For details, refer to the foregoing descriptions. Details are not described herein again.

In one embodiment of the present invention, a physical (PHY) layer of the terminal device reports communication failure information to a media access control (MAC) layer of the terminal device every X milliseconds (ms) or X slots. Therefore, when the communication failure occurs Q consecutive times, it is considered that the communication failure occurs. A counting start moment is defined for Q in this embodiment of the present invention, to ensure that all reference signals in second reference signals can be included during the communication failure that occurs the counted Q times. To be specific, counting starts only after a reference signal corresponding to a maximum sending periodicity in the second reference signals is less than or equal to the preset threshold; and when a value of the counting reaches Q, it is determined that the communication failure occurs. There are one or more second reference signals. Generally, each reference signal in the second reference signals is a reference signal to be periodically sent. The network device sends the reference signal based on a preset periodicity.

S202: The network device sends the PDCCH by using the first control resource set within a first time period after the moment n.

S203: If the terminal device detects, within the first time period after the moment n, that channel quality of the PDCCH on the first control resource set meets a first preset condition, the terminal device cancels sending of communication failure recovery request information, and/or stops timing of a communication failure recovery clock.

In one embodiment, the terminal device detects the PDCCH on the first control resource set within the first time period after the moment n.

In one embodiment of the present invention, an end moment of the first time period is earlier than or equal to a moment (namely, the fourth moment shown in FIG. 4) at which the terminal device receives the communication failure recovery response information, or an end moment of the first time period is earlier than or equal to a moment (namely, the fifth moment shown in FIG. 4) at which the terminal device receives reconfigured QCL assumption information for the first time after receiving the communication failure recovery response information. Herein, that the terminal device receives QCL assumption information means that the terminal device receives TCI reconfiguration information sent by the network device. The TCI reconfiguration information may be configured for the PDCCH, and used to indicate QCL information of the PDCCH. In this case, the QCL information indicates that a DMRS on the PDCCH has a QCL relationship with a reference signal indicated by the TCI reconfiguration information. Alternatively, the TCI reconfiguration information may be configured for a PDSCH, and used to indicate QCL information of the PDSCH. In this case, the QCL information indicates that a DMRS on the PDSCH has a QCL relationship with a reference signal indicated by the TCI reconfiguration information. For example, it is assumed that after receiving the communication failure recovery response information sent by the network device, the terminal device measures beams, and indicates, in a reported beam measurement report, M base station transmit beams corresponding to good quality. In this case, the network device reconfigures M TCI states. The M TCI states correspond to downlink reference signals associated with the M base station transmit beams corresponding to good quality. One TCI state is used to indicate that the terminal device uses one or more receive beams that are used by the terminal device to receive a downlink reference signal associated with a base station transmit beam corresponding to the TCI state, to receive the PDCCH. Herein, the M TCI states are the TCI reconfiguration information.

Figure 9:
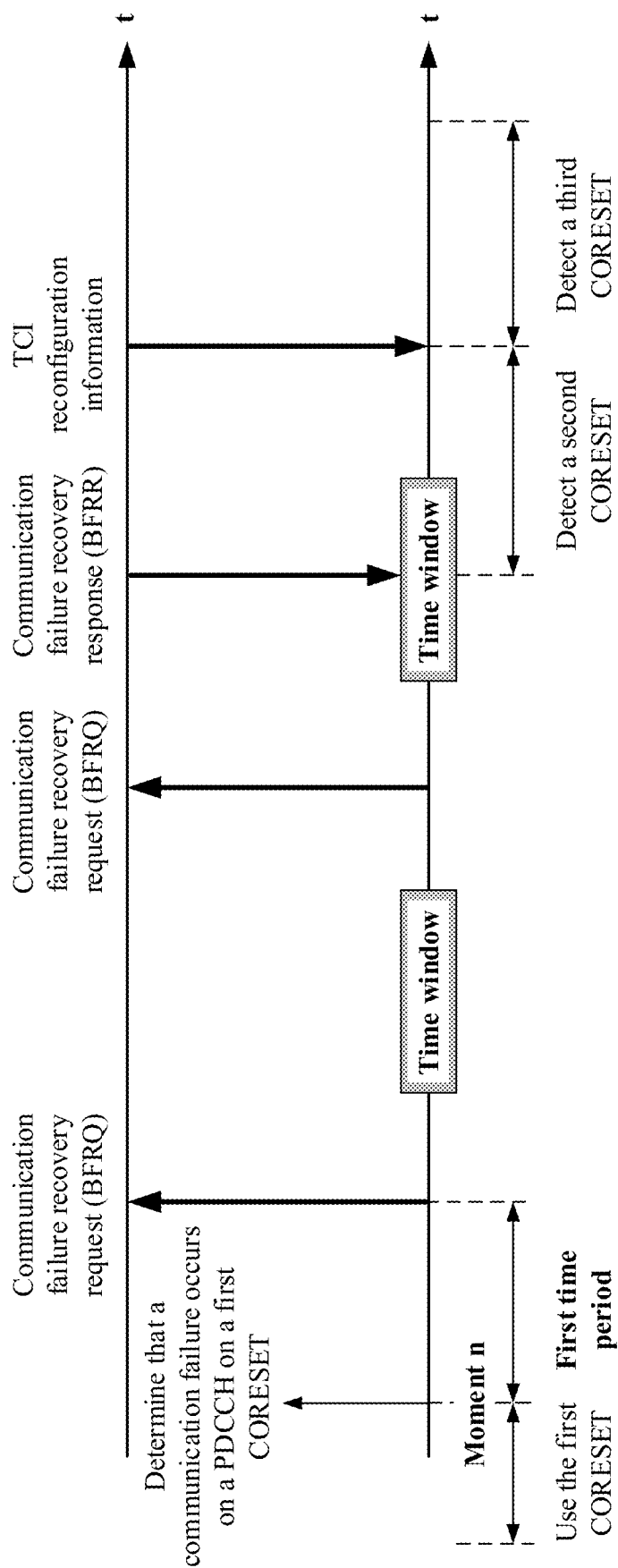
FIG. 9 is a schematic diagram of a first time period according to an embodiment of the present invention.

In one embodiment, a start moment of the first time period is later than or equal to the moment n, and/or the end moment of the first time period is earlier than or equal to a moment at which the terminal device sends the communication failure recovery request information for the first time after the moment n. FIG. 9 shows an example of the first time period according to an embodiment of the present invention. As shown in FIG. 9, the start moment of the first time period is a moment at which the terminal device determines that the communication failure occurs on the PDCCH on the first control resource set, namely, the moment n, and the end moment of the first time period is the moment at which the terminal device sends the communication failure recovery request information for the first time after the moment n. In FIG. 9, a description is provided by using an example in which the first time period is an entire time period from the moment n to the moment at which the terminal device sends the communication failure recovery request information for the first time after the moment n. In another implementation, the first time period may alternatively be a part of a time period from the moment n to the moment at which the terminal device sends the communication failure recovery request information for the first time after the moment n.

Figure 10:
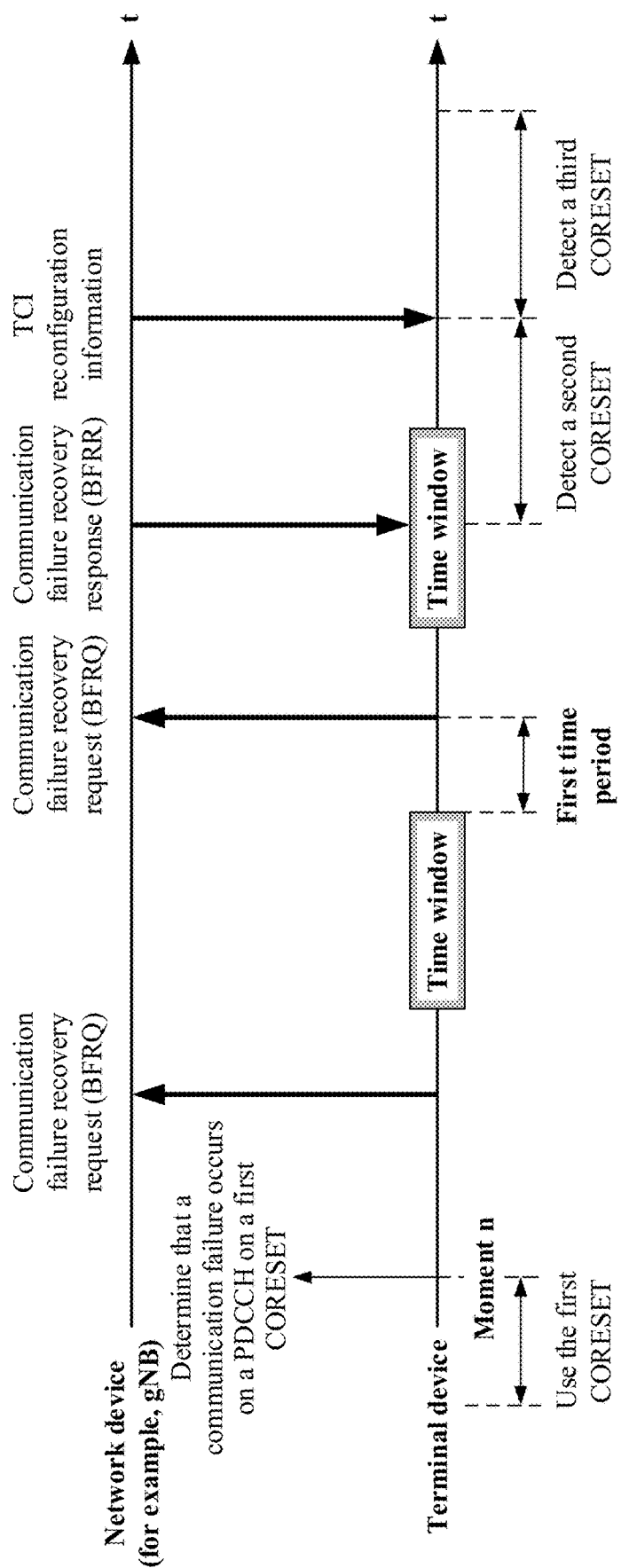
FIG. 10 is a schematic diagram of another first time period according to an embodiment of the present invention.

In another embodiment, the start moment of the first time period is later than or equal to an end moment of a communication failure recovery response time window, and/or the end moment of the first time period is earlier than or equal to a moment at which the terminal device sends the communication failure recovery request information for a next time after the communication failure recovery response time window. The communication failure recovery response time window is used to detect the communication failure recovery response information. As shown in FIG. 10, the start moment of the first time period is the end moment of the communication failure recovery response time window, and the end moment of the first time period is the moment at which the terminal device sends the communication failure recovery request information for the next time after the communication failure recovery response time window. In FIG. 10, a description is provided by using an example in which the first time period is an entire time period from the end moment of the communication failure recovery response time window to the moment at which the terminal device sends the communication failure recovery request information for the next time after the communication failure recovery response time window. In another embodiment, the first time period may alternatively be a part of a time period from the end moment of the communication failure recovery response time window to the moment at which the terminal device sends the communication failure recovery request information for the next time after the communication failure recovery response time window. In FIG. 10, a description is provided by using an example in which the first time period includes one time period. In an actual application, if the terminal device does not receive, before a specified time or a specified quantity of times is reached, a communication failure recovery response sent by the network device, the terminal device may continue to send a communication failure recovery request, and continue to detect the communication failure recovery response information within the communication failure recovery response time window.

In one embodiment, the first time period may be the first time period described in the foregoing two implementations. For example, the first time period includes the first time period shown in FIG. 9 and the first time period shown in FIG. 10.

In one embodiment of the present invention, the start moment and/or the end moment of the first time period may be defined in a protocol, or may be configured by the network device.

In one embodiment, that channel quality of the PDCCH on the first control resource set meets a first preset condition includes one or more of the following six cases:

the terminal device detects the PDCCH on the first control resource set L times, where L is a positive integer greater than or equal to 1;

channel quality corresponding to the DMRS on the PDCCH is greater than or equal to channel quality corresponding to a first reference signal, where the first reference signal is a downlink reference signal that is associated with the communication failure recovery request information and that is greater than or equal to a first threshold;

a difference between the channel quality corresponding to the DMRS on the PDCCH and signal quality of the first reference signal is greater than or equal to a second threshold;

the channel quality corresponding to the DMRS on the PDCCH is greater than or equal to a third threshold;

channel quality corresponding to the second reference signal is greater than or equal to the channel quality corresponding to the first reference signal, where the second reference signal is used to detect that the communication failure occurs on the physical downlink control channel PDCCH on the first control resource set;

a difference between the channel quality corresponding to the second reference signal and the signal quality of the first reference signal is greater than or equal to a fourth threshold; and/or the channel quality corresponding to the second reference signal is greater than or equal to a fifth threshold.

That the terminal device detects the PDCCH on the first control resource set means that the terminal device can correctly decode or successfully decode the PDCCH on the first control resource set.

In one embodiment of the present invention, the first reference signal is the downlink reference signal associated with the communication failure recovery request information. The downlink reference signal associated with the communication failure recovery request information is a downlink reference signal that is identified by the terminal device in the embodiment shown in FIG. 3 and that has good channel quality.

In one embodiment, that the terminal device detects the PDCCH on the first control resource set L times includes: the terminal device detects the PDCCH on the first control resource set L consecutive times, the terminal device detects the PDCCH on the first control resource set L times within a first preset time period, or the terminal device detects the PDCCH on the first control resource set L of P times for detecting the PDCCH on the first control resource set, where P is a positive integer greater than or equal to N.

In one embodiment, that channel quality corresponding to the DMRS on the PDCCH is greater than or equal to channel quality corresponding to a first reference signal includes: the channel quality corresponding to the DMRS on the PDCCH is greater than or equal to the channel quality corresponding to the first reference signal M1 times.

In one embodiment, that the channel quality corresponding to the DMRS on the PDCCH is greater than or equal to the channel quality corresponding to the first reference signal M1 times includes: the channel quality corresponding to the DMRS on the PDCCH is greater than or equal to the channel quality corresponding to the first reference signal M1 consecutive times, the channel quality corresponding to the DMRS on the PDCCH is greater than or equal to the channel quality corresponding to the first reference signal M1 times within a second preset time period, or the channel quality corresponding to the DMRS on the PDCCH is greater than or equal to the channel quality corresponding to the first reference signal M1 of O1 times.

In one embodiment, that a difference between the channel quality corresponding to the DMRS on the PDCCH and signal quality of the first reference signal is greater than or equal to a second threshold includes: the difference between the channel quality corresponding to the DMRS on the PDCCH and the signal quality of the first reference signal is greater than or equal to the second threshold M2 times.

In one embodiment, that the difference between the channel quality corresponding to the DMRS on the PDCCH and the signal quality of the first reference signal is greater than or equal to the second threshold M2 times includes: the difference between the channel quality corresponding to the DMRS on the PDCCH and the signal quality of the first reference signal is greater than or equal to the second threshold M2 consecutive times, the difference between the channel quality corresponding to the DMRS on the PDCCH and the signal quality of the first reference signal is greater than or equal to the second threshold M2 times within a third preset time period, or the difference between the channel quality corresponding to the DMRS on the PDCCH and the signal quality of the first reference signal is greater than or equal to the second threshold M2 of O2 times.

In one embodiment, that the channel quality corresponding to the DMRS on the PDCCH is greater than or equal to a third threshold includes: the channel quality corresponding to the DMRS on the PDCCH is greater than or equal to the third threshold M3 times.

In one embodiment, that the channel quality corresponding to the DMRS on the PDCCH is greater than or equal to the third threshold M3 times includes: the channel quality corresponding to the DMRS on the PDCCH is greater than or equal to the third threshold M3 consecutive times, the channel quality corresponding to the DMRS on the PDCCH is greater than or equal to the third threshold within a fourth preset time period, or the channel quality corresponding to the DMRS on the PDCCH is greater than or equal to the third threshold M3 of O3 times.

In one embodiment, that channel quality corresponding to the second reference signal is greater than or equal to the channel quality corresponding to the first reference signal includes: the channel quality corresponding to the second reference signal is greater than or equal to the channel quality corresponding to the first reference signal M4 times.

In one embodiment, that the channel quality corresponding to the second reference signal is greater than or equal to the channel quality corresponding to the first reference signal M4 times includes: the channel quality corresponding to the second reference signal is greater than or equal to the channel quality corresponding to the first reference signal M4 consecutive times, the channel quality corresponding to the second reference signal is greater than or equal to the channel quality corresponding to the first reference signal M4 times within a fifth preset time period, or the channel quality corresponding to the second reference signal is greater than or equal to the channel quality corresponding to the first reference signal M4 of O4 times.

In one embodiment, that a difference between the channel quality corresponding to the second reference signal and the signal quality of the first reference signal is greater than or equal to a fourth threshold includes: the difference between the channel quality corresponding to the second reference signal and the signal quality of the first reference signal is greater than or equal to the fourth threshold M5 times.

In one embodiment, that the difference between the channel quality corresponding to the second reference signal and the signal quality of the first reference signal is greater than or equal to the fourth threshold M5 times includes: the difference between the channel quality corresponding to the second reference signal and the signal quality of the first reference signal is greater than or equal to the fourth threshold M5 consecutive times, the difference between the channel quality corresponding to the second reference signal and the signal quality of the first reference signal is greater than or equal to the fourth threshold M5 times within a sixth preset time period, or the difference between the channel quality corresponding to the second reference signal and the signal quality of the first reference signal is greater than or equal to the fourth threshold M5 of O5 times.

In one embodiment, that the channel quality corresponding to the second reference signal is greater than or equal to a fifth threshold includes: the channel quality corresponding to the second reference signal is greater than or equal to the fifth threshold M6 times.

In one embodiment, that the channel quality corresponding to the second reference signal is greater than or equal to the fifth threshold M6 times includes: the channel quality corresponding to the second reference signal is greater than or equal to the fifth threshold M6 consecutive times, the channel quality corresponding to the second reference signal is greater than or equal to the fifth threshold within a seventh preset time period, or the channel quality corresponding to the second reference signal is greater than or equal to the fifth threshold M6 of O6 times.

In one embodiment, the first threshold to the sixth threshold may be specified in a protocol, or may be configured by the network device.

In one embodiment, the third threshold and the fifth threshold each may be an IS threshold for a radio link failure.

It should be noted that M1 to M6 and O1 to O6 are all positive integers.

In one embodiment, the channel quality includes one or more of reference signal received power (RSRP), reference signal received quality (RSRQ), a block error rate (BLER), a signal to interference plus noise ratio (SINR), and a signal-to-noise ratio (SNR). The BLER may be a hypothetical PDCCH BLER, that is, a hypothetical PDCCH BLER.

In one embodiment of the present invention, if the terminal device detects, within the first time period after the moment n, that the channel quality of the PDCCH on the first control resource set meets the first preset condition, the terminal device cancels sending of the communication failure recovery request information and/or stops timing of the communication failure recovery clock, in other words, the terminal device cancels or stops the communication failure recovery process. Otherwise, the terminal device continues to send the communication failure recovery request information and/or proceeds with timing of the communication failure recovery clock, in other words, the terminal device proceeds with the communication failure recovery process. The canceling sending of the communication failure recovery request information includes: stopping counting of a communication failure recovery counter.

A communication failure recovery timer and/or the communication failure recovery counter are set, to avoid that the communication failure recovery process lasts for an excessively long time. If the terminal device detects, within the first time period after the moment n, that the channel quality of the PDCCH on the first control resource set meets the first preset condition, the terminal device resets the timer or stops timing. In this case, the terminal device no longer sends the communication failure recovery request information, namely, cancels the communication failure recovery process. Alternatively, if the terminal device detects, within the first time period after the moment n, that the channel quality of the PDCCH on the first control resource set meets the first preset condition, the terminal device resets the counter or stops counting. In this case, the terminal device no longer sends the communication failure recovery request information, namely, cancels the communication failure recovery process. Alternatively, if the terminal device detects, within the first time period after the moment n, that the channel quality of the PDCCH on the first control resource set meets the first preset condition, the terminal device resets the timer or stops timing, and resets the counter or stops counting. In this case, the terminal device no longer sends the communication failure recovery request information, namely, cancels the communication failure recovery process.

For example, if the terminal device detects, within the first time period after the moment n, that the channel quality of the PDCCH on the first control resource set meets the first preset condition, the terminal device sets the timer to a maximum value. Therefore, the communication failure recovery process is stopped, and the terminal device no longer sends the communication failure recovery request information. Alternatively, if the terminal device detects, within the first time period after the moment n, that the channel quality of the PDCCH on the first control resource set meets the first preset condition, the terminal device sets the counter to a maximum value. Therefore, the communication failure recovery process is stopped, and the terminal device no longer sends the communication failure recovery request information.

For another example, if the terminal device detects, within the first time period after the moment n, that the channel quality of the PDCCH on the first control resource set meets the first preset condition, the terminal device resets the timer to 0. Therefore, the communication failure recovery process is stopped, and the terminal device no longer sends the communication failure recovery request information. Alternatively, if the terminal device detects, within the first time period after the moment n, that the channel quality of the PDCCH on the first control resource set meets the first preset condition, the terminal device resets the counter to 0. Therefore, the communication failure recovery process is stopped, and the terminal device no longer sends the communication failure recovery request information.

For another example, if the terminal device detects, within the first time period after the moment n, that the channel quality of the PDCCH on the first control resource set meets the first preset condition, the terminal device stops timing. Therefore, the communication failure recovery process is stopped, and the terminal device no longer sends the communication failure recovery request information. Alternatively, if the terminal device detects, within the first time period after the moment n, that the channel quality of the PDCCH on the first control resource set meets the first preset condition, the terminal device stops counting. Therefore, the communication failure recovery process is stopped, and the terminal device no longer sends the communication failure recovery request information.

In one embodiment, when a delay between the moment n and the moment at which the terminal device sends the communication failure recovery request information for the first time after the moment n is greater than or equal to a preset threshold, the method embodiment shown in FIG. 7 is implemented. To be specific, it is ensured that the delay between the moment n and the moment at which the terminal device sends the communication failure recovery request information for the first time after the moment n is long enough for the terminal device to detect whether the channel quality of the PDCCH on the first control resource set meets the first preset condition. Herein, the preset threshold may be predefined in a protocol or configured by the network device for the terminal device.

In one embodiment, the terminal device does not detect the PDCCH on the first control resource set and a PDCCH on a second control resource set within a second time period after sending the communication failure recovery request information. Herein, the second control resource set is used by the network device to send the communication failure recovery response information to the terminal device, and the second control resource set is a CORESET resource specially configured for link failure recovery after the communication failure occurs. When the communication failure occurs, the terminal device detects, on the second control resource set, downlink control information sent by the network device. The second control resource set may be configured by the network device for the terminal device. That the terminal device does not detect a control resource set means that the terminal device skips detecting the control resource set. Specifically, that the terminal device does not detect the PDCCH on the first control resource set means that the terminal device skips detecting the PDCCH on the first control resource set. That the terminal device does not detect the PDCCH on the second control resource set means that the terminal device skips detecting the PDCCH on the second control resource set.

Figure 11:
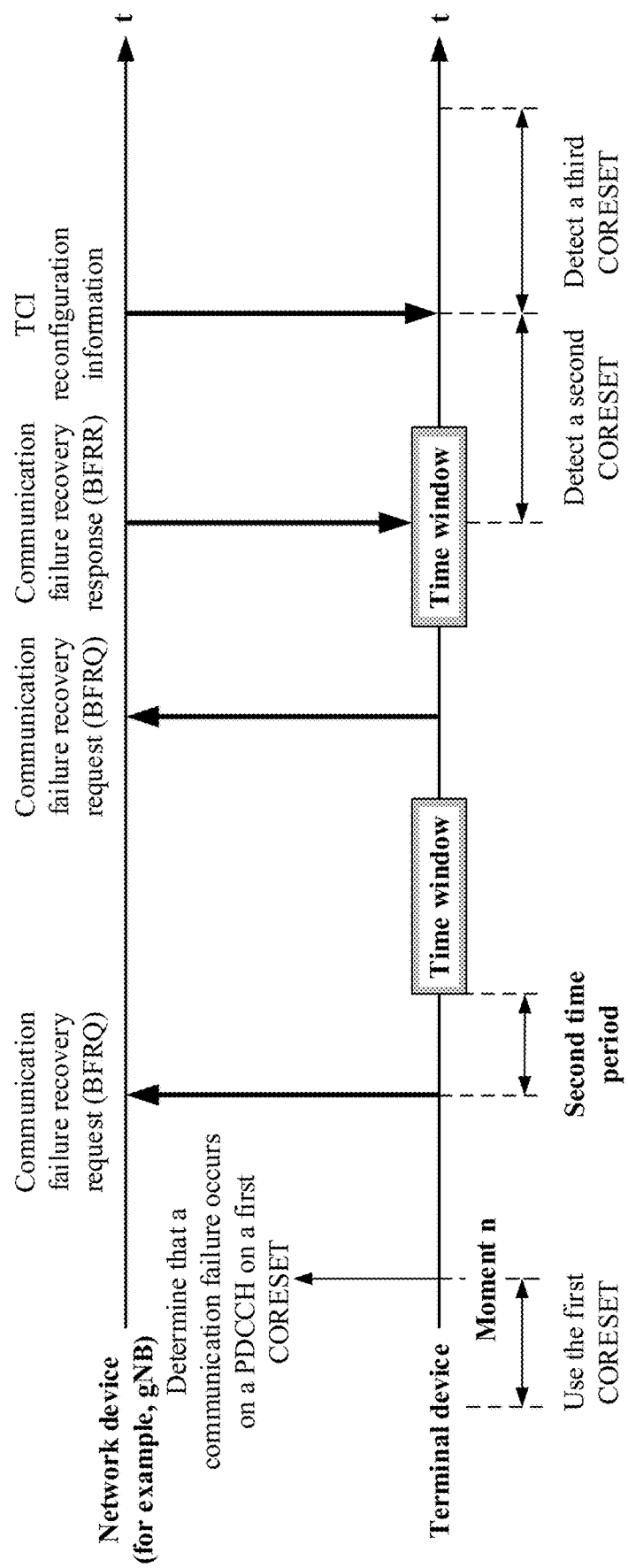
FIG. 11 is a schematic diagram of a second time period according to an embodiment of the present invention.

In one embodiment of the present invention, an end moment of the second time period is earlier than or equal to a start moment of a next communication failure recovery response time window after sending the communication failure recovery request information by the terminal device. The communication failure recovery response time window is used to detect the communication failure recovery response information. As shown in FIG. 11, a start moment of the second time period is a moment at which the terminal device sends the communication failure recovery request information, and the end moment of the second time period is the start moment of the next communication failure recovery response time window after sending the communication failure recovery request information by the terminal device. The terminal device does not detect a control resource set within the second time period. In FIG. 11, a description is provided by using an example in which the second time period includes one time period. In actual application, if the terminal device does not receive, before a specified time or a specified quantity of times is reached, a communication failure recovery response sent by the network device, the terminal device may continue to send a communication failure recovery request, and continue to detect the communication failure recovery response information within the communication failure recovery response time window.

In one embodiment, the terminal device detects only the PDCCH on the second control resource set within a communication failure recovery response time window.

The following describes in detail, by using a plurality of embodiments, solutions in which a terminal device in the embodiments of the present invention detects different control resource sets within different time periods.

(1) Embodiment 1

Figure 12:
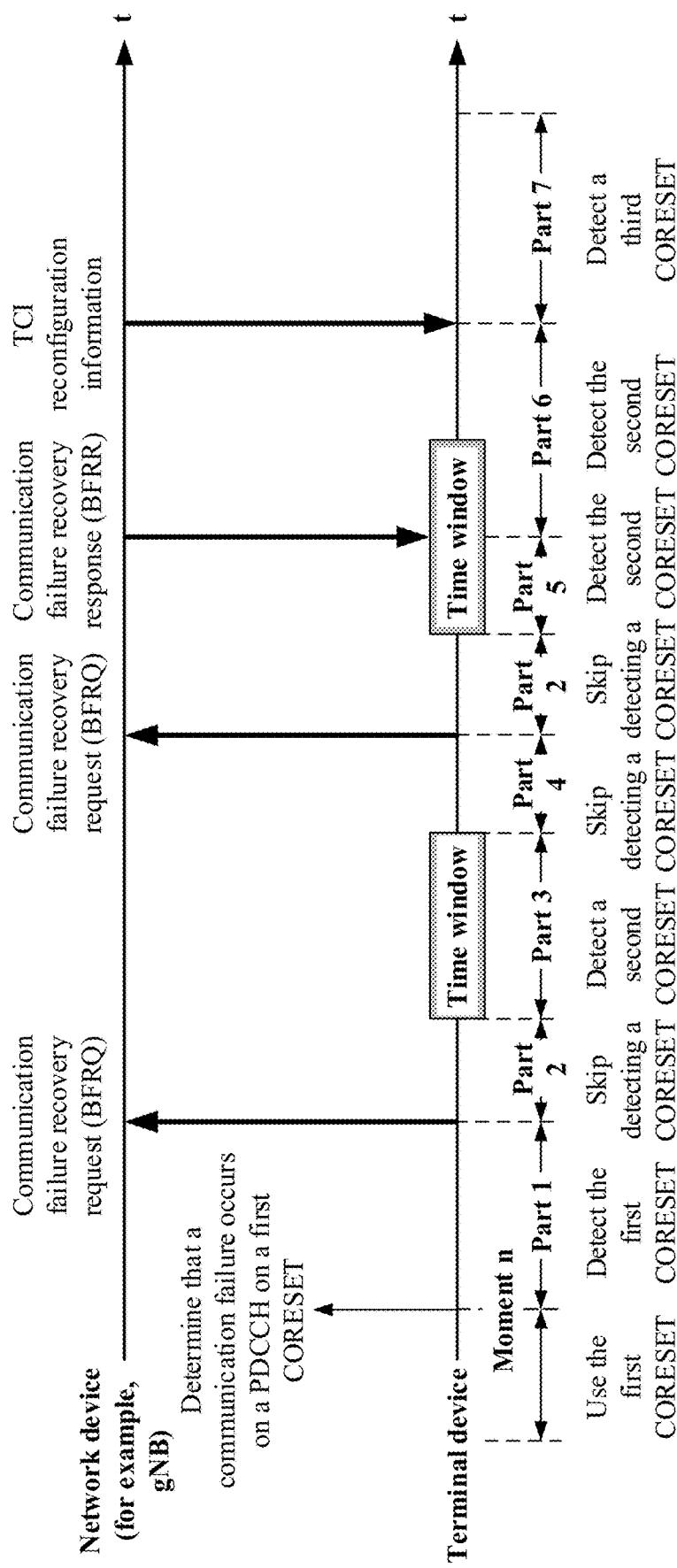
FIG. 12 is a schematic diagram of detecting, by a terminal device, different control resource sets in different time periods according to an embodiment of the present invention.

As shown in FIG. 12, in this embodiment, a start moment of a first time period is a moment at which the terminal device determines that a communication failure occurs on a PDCCH on a first control resource set, namely, a moment n, and an end moment of the first time period is a moment at which the terminal device sends communication failure recovery request information for the first time after the moment n. In other words, a part 1 in FIG. 12 is the first time period.

In Embodiment 1, a control resource set (CORESET) detected in each part is specifically as follows:

In the part 1, the terminal device detects the first CORESET.

A start moment of the part 1 (namely, the first time period) is the moment at which the terminal device determines that the communication failure occurs on the PDCCH on the first control resource set, namely, the moment n. An end moment of the first time period is the moment at which the terminal device sends the communication failure recovery request information for the first time after the moment n.

In a part 2, the terminal device does not detect a CORESET.

A start moment of the part 2 is a moment at which the terminal device sends the communication failure recovery request information, and an end moment of the part 2 is a start moment of a corresponding communication failure recovery response time window after sending the communication failure recovery request information by the terminal device.

That the terminal device does not detect a CORESET means that the terminal device does not detect the first CORESET, a second CORESET, and a third CORESET.

In a part 3, the terminal device detects the second CORESET.

A start moment of the part 3 is a start moment of the communication failure recovery response time window within which the terminal device receives no communication failure recovery response information, and an end moment of the part 3 is an end moment of the communication failure recovery response time window within which the terminal device receives no communication failure recovery response information.

In a part 4, the terminal device does not detect a CORESET.

A start moment of the part 4 is the end moment of the communication failure recovery response time window within which the terminal device receives no communication failure recovery response information, and an end moment of the part 4 is a start moment at which the terminal device sends the communication failure recovery request information for a next time after the communication failure recovery response time window.

In a part 5, the terminal device detects the second CORESET.

A start moment of the part 5 is a start moment of a communication failure recovery response time window within which the terminal device receives communication failure recovery response information, and an end moment of the part 5 is a moment at which the terminal device receives the communication failure recovery response information.

In a part 6, the terminal device detects the second CORESET.

A start moment of the part 6 is the moment at which the terminal device receives the communication failure recovery response information, and an end moment of the part 6 is a moment at which the terminal device receives TCI reconfiguration information.

It should be noted that the part 5 and the part 6 each may be one part, or may be divided into 2 parts. This is not specifically limited in the embodiments of the present invention.

In a part 7, the terminal device detects the third CORESET.

A start moment of the part 7 is the moment at which the terminal device receives the TCI reconfiguration information.

For related descriptions of the first CORESET, the second CORESET, and the third CORESET, refer to the foregoing embodiments. Details are not described herein again.

(2) Embodiment 2

Figure 13:
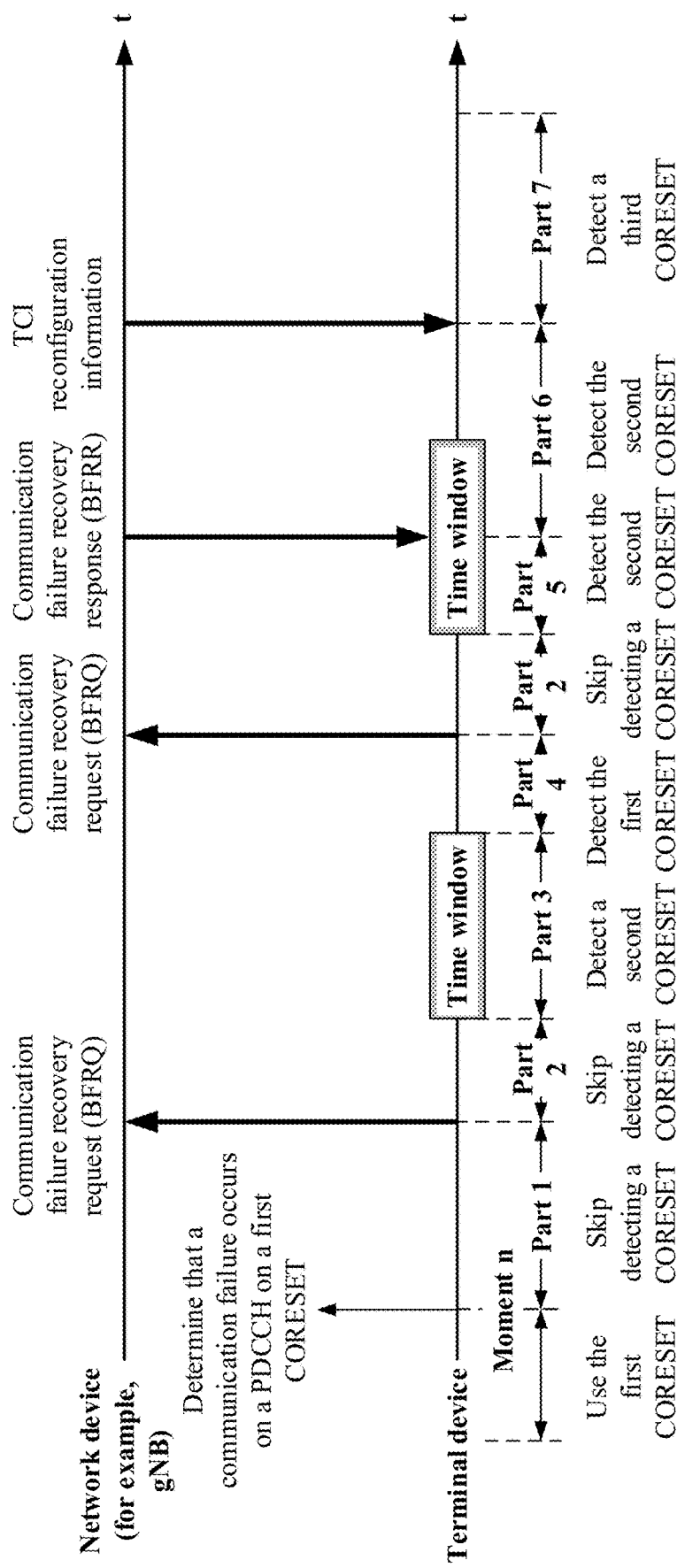
FIG. 13 is another schematic diagram of detecting, by a terminal device, different control resource sets in different time periods according to an embodiment of the present invention.

As shown in FIG. 13, in one embodiment of the present invention, a start moment of a first time period is an end moment of a communication failure recovery response time window within which the terminal device receives no communication failure recovery response information. An end moment of the first time period is a start moment at which the terminal device sends communication failure recovery request information for a next time after the communication failure recovery response time window. In other words, a part 4 in FIG. 13 is the first time period.

In Embodiment 1, a control resource set (CORESET) detected in each part is specifically as follows:

In a part 1, the terminal device does not detect a CORESET.

In a part 2, the terminal device does not detect a CORESET.

In a part 3, the terminal device detects a second CORESET.

In the part 4, the terminal device detects a first CORESET.

In a part 5, the terminal device detects the second CORESET.

In a part 6, the terminal device detects the second CORESET.

In a part 7, the terminal device detects a third CORESET.

(3) Embodiment 3

Figure 14:
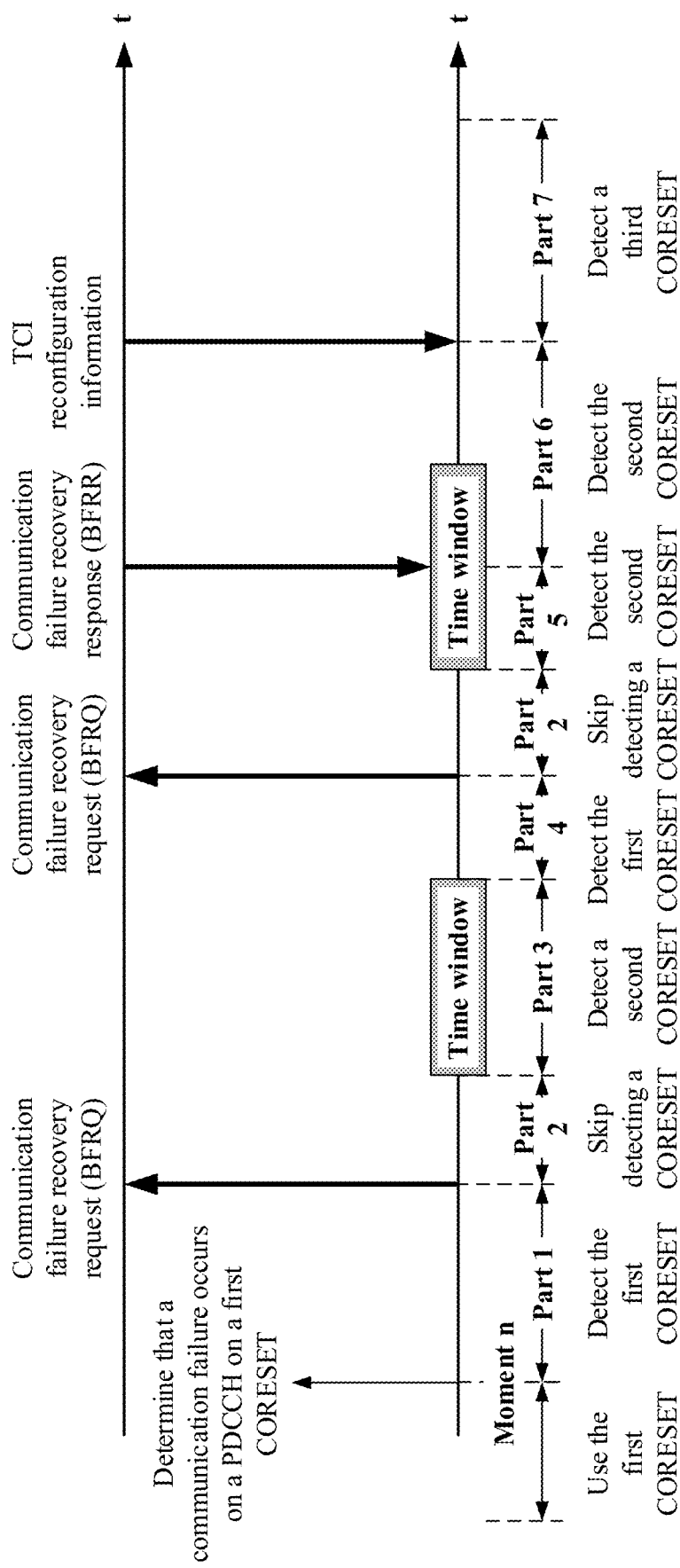
FIG. 14 is another schematic diagram of detecting, by a terminal device, different control resource sets in different time periods according to an embodiment of the present invention.

As shown in FIG. 14, in one embodiment of the present invention, a start moment of a first time period is a moment at which the terminal device determines that a communication failure occurs on a PDCCH on a first control resource set, namely, a moment n, and an end moment of the first time period is a moment at which the terminal device sends communication failure recovery request information for the first time after the moment n. In addition, the start moment of the first time period is an end moment of a communication failure recovery response time window within which the terminal device receives no communication failure recovery response information, and the end moment of the first time period is a start moment at which the terminal device sends the communication failure recovery request information for a next time after the communication failure recovery response time window. In other words, the part 1 and the part 4 in FIG. 14 are the first time period.

In Embodiment 3, a control resource set (CORESET) detected in each part is specifically as follows:

In the part 1, the terminal device detects the first CORESET.

In a part 2, the terminal device does not detect a CORESET.

In a part 3, the terminal device detects a second CORESET.

In the part 4, the terminal device detects the first CORESET.

In a part 5, the terminal device detects the second CORESET.

In a part 6, the terminal device detects the second CORESET.

In a part 7, the terminal device detects a third CORESET.

It should be noted that, in Embodiment 1 to Embodiment 3, "detecting the first CORESET" may be understood as detecting a PDCCH on the first CORESET, "detecting the second CORESET" may be understood as detecting a PDCCH on the second CORESET, and "detecting the third CORESET" may be understood as detecting a PDCCH on the third CORESET.

Optionally, in Embodiment 1 to Embodiment 3, the terminal device may further detect the first CORESET in the part 3 and the part 5. In other words, the terminal device detects both the first CORESET and the second CORESET in the part 3 and the part 5. In this case, in an implementation, if the terminal device detects only the first CORESET, the terminal device proceeds with a communication failure recovery process, and waits to receive communication failure recovery response information returned by a network device. After receiving the communication failure recovery response information, the terminal device compares channel quality corresponding to the first CORESET with channel quality corresponding to the second CORESET, selects a CORESET corresponding to better channel quality, and reports the CORESET to the network device, to notify the network device to use the CORESET corresponding to better channel quality for communication. Herein, manners of comparing the channel quality corresponding to the first CORESET with the channel quality corresponding to the second CORESET include but are not limited to the following several manners: Compare channel quality corresponding to a DMRS corresponding to the first CORESET with channel quality corresponding to a DMRS corresponding to the second CORESET; compare channel quality corresponding to a DMRS corresponding to the first CORESET with channel quality corresponding to a first reference signal corresponding to the second CORESET; compare channel quality corresponding to a second reference signal corresponding to the first CORESET with channel quality corresponding to a DMRS corresponding to the second CORESET; or compare channel quality corresponding to a second reference signal corresponding to the first CORESET with channel quality corresponding to a first reference signal corresponding to the second CORESET. The first reference signal is a downlink reference signal that is associated with the communication failure request information and that is greater than or equal to a preset threshold, and the first reference signal is a downlink reference signal that is identified by the terminal device in step S101 and that has good signal quality. In one embodiment, the first reference signal has a QCL relationship with the DMRS corresponding to the second CORESET. The second reference signal is used to detect that the communication failure occurs on the first CORESET.

In one embodiment, if the terminal device detects only the first CORESET, the terminal device sends indication information to a network device, where the indication information is used to indicate the terminal device to select to continue to use the first CORESET to communicate with the network device, to avoid inconsistency between a CORESET selected by the terminal device and a CORESET selected by the network device.

In Embodiment 1 to Embodiment 3, the terminal device may further detect the first CORESET in the part 2. In this case, if the terminal device detects the first CORESET, the terminal device sends indication information to the network device, where the indication information is used to indicate the terminal device to select to continue to use the first CORESET to communicate with the network device, to avoid inconsistency between a CORESET selected by the terminal device and a CORESET selected by the network device.

According to the method embodiment shown in FIG. 8, after the communication failure occurs on the PDCCH on the first control resource set, if the terminal device detects that the channel quality of the PDCCH on the first control resource set meets a particular condition, the terminal device stops the communication failure recovery process, continues to receive the downlink control information through the PDCCH on the first control resource set. Compared with a manner in which the terminal device waits for the network device to reconfigure a TCI after the communication failure occurs on the PDCCH on the first control resource set, the method can rapidly recover a link, and improve system robustness.

Figure 15:
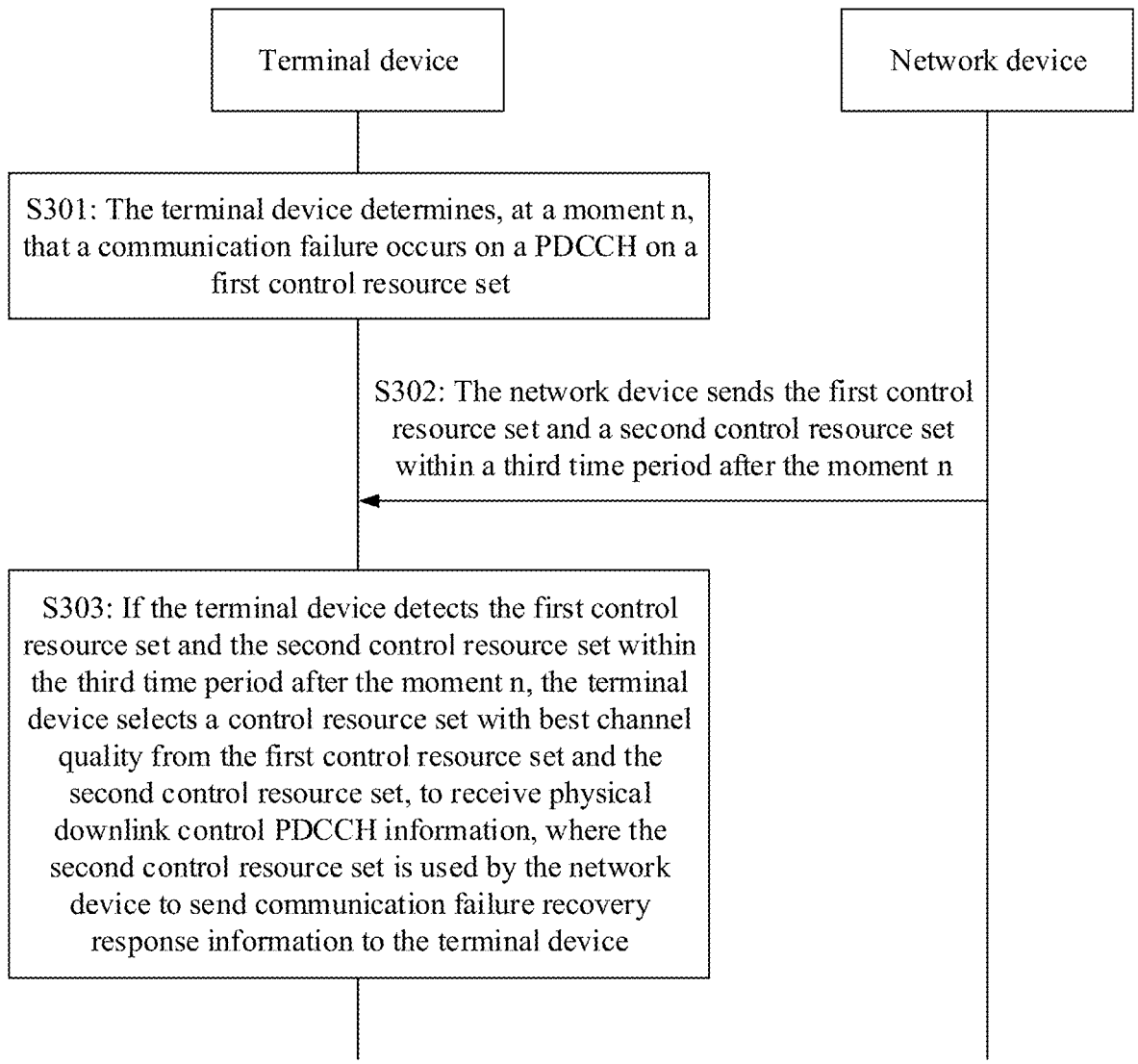
FIG. 15 is a schematic flowchart of another information transmission method according to an embodiment of the present invention.

In addition, FIG. 15 is a general schematic flowchart of another information transmission method according to an embodiment of the present invention. In one embodiment of the present invention, if a terminal device detects a first CORESET and a second CORESET within a time period after receiving communication failure recovery response information and before receiving TCI reconfiguration information, how the terminal device selects a CORESET used for communication is mainly discussed. As shown in FIG. 15, the information transmission method provided in this embodiment of the present invention may include the following operations.

S301: The terminal device determines, at a moment n, that a communication failure occurs on a PDCCH on a first control resource set.

For specific descriptions of step S301, refer to related descriptions of S201. Details are not described herein again.

S302. A network device sends a first control resource set and a second control resource set within a third time period after a moment n.

S303: If the terminal device detects the first control resource set and the second control resource set within the third time period after the moment n, the terminal device selects, from the first control resource set and the second control resource set, a control resource set corresponding to channel quality that meets a second preset condition, to receive physical downlink control information PDCCH, where the second control resource set is used by the network device to send communication failure recovery response information to the terminal device.

In one embodiment, the control resource set, from the first control resource set and the second control resource set, corresponding to the channel quality that meets the second preset condition includes one or more of the following:

higher channel quality in channel quality corresponding to a demodulation reference signal DMRS corresponding to the first control resource set and channel quality corresponding to a demodulation reference signal DMRS corresponding to the second control resource set, higher channel quality in channel quality corresponding to a demodulation reference signal DMRS corresponding to the first control resource set and channel quality corresponding to a first reference signal corresponding to the second control resource set, higher channel quality in channel quality corresponding to a second reference signal corresponding to the first control resource set and channel quality corresponding to a demodulation reference signal DMRS corresponding to the second control resource set, or higher channel quality in channel quality corresponding to a second reference signal corresponding to the first control resource set and channel quality corresponding to a first reference signal corresponding to the second control resource set.

The first reference signal is a downlink reference signal that is associated with communication failure request information and that is greater than or equal to a preset threshold, and the first reference signal is a downlink reference signal that is identified by the terminal device in step S101 and that has good signal quality. The first reference signal has a QCL relationship with the DMRS corresponding to the second CORESET, and the second reference signal is used to detect that the communication failure occurs on the first control resource set.

Figure 16:
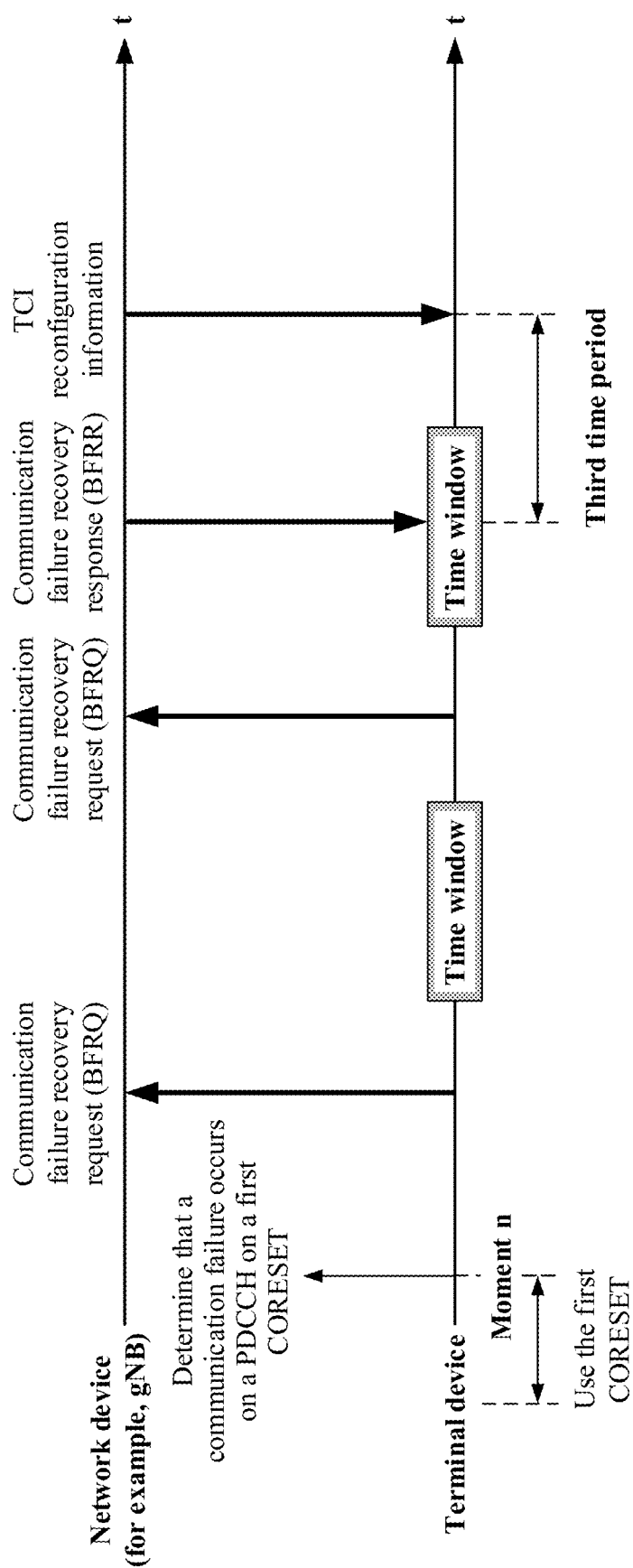
FIG. 16 is a schematic diagram of a third time period according to an embodiment of the present invention.

In one embodiment, a start moment of the third time period is later than or equal to a moment (namely, the fourth moment shown in FIG. 4) at which the terminal device receives the communication failure recovery response information, and/or an end moment of the third time period is earlier than or equal to a moment (namely, the fifth moment shown in FIG. 4) at which the terminal device receives reconfigured quasi co-location QCL assumption information for the first time after receiving the communication failure recovery response information. Specifically, for details about the third time period, refer to FIG. 16.

Herein, the TCI reconfiguration information may be configured for the PDCCH, and used to indicate QCL information of the PDCCH. Alternatively, the TCI reconfiguration information may be configured for a PDSCH, and used to indicate QCL information of the PDSCH. In this embodiment of the present invention, if a TCI state is configured for the PDCCH, the QCL information indicates that a DMRS on the PDCCH has a QCL relationship with a reference signal indicated by the TCI reconfiguration information. If a TCI state is configured for the PDSCH, the QCL information indicates that a DMRS on the PDSCH has a QCL relationship with a reference signal indicated by the TCI reconfiguration information. The TCI reconfiguration information includes one or more TCI states, and one TCI state indicates one piece of QCL information. For example, it is assumed that after receiving the communication failure recovery response information sent by the network device, the terminal device measures beams, and indicates, in a reported beam measurement report, M base station transmit beams corresponding to good quality. In this case, the network device reconfigures M TCI states. The M TCI states correspond to downlink reference signals associated with the M base station transmit beams corresponding to good quality. One TCI state is used to indicate that the terminal device uses one or more receive beams that are used by the terminal device to receive a downlink reference signal associated with a base station transmit beam corresponding to the TCI state, to receive the PDCCH. Herein, the M TCI states are the TCI reconfiguration information.

In one embodiment, the channel quality includes one or more of reference signal received power (reference signal received power, RSRP), reference signal received quality (reference signal receiving quality, RSRQ), a block error rate (block error rate, BLER), a signal to interference plus noise ratio (signal to interference plus noise ratio, SINR), and a signal-to-noise ratio (signal-to-noise ratio, SNR). The BLER may be a hypothetical PDCCH BLER, that is, a hypothetical PDCCH BLER.

In one embodiment of the present invention, a physical (PHY) layer of the terminal device reports communication failure information to a media access control (MAC) layer of the terminal device every X milliseconds (ms) or X slots. Therefore, when the communication failure occurs Q consecutive times, it is considered that the communication failure occurs. A counting start moment is defined for Q in this embodiment of the present invention, to ensure that all reference signals in second reference signals can be included during the communication failure that occurs the counted Q times. To be specific, counting starts only after a communication failure occurs on a reference signal corresponding to a maximum sending periodicity in the second reference signals; and when a value of the counting reaches Q, it is determined that the communication failure occurs.

In one embodiment, the terminal device detects the first control resource set and the second control resource set within the third time period after the moment n.

After selecting, from the first control resource set and the second control resource set, the control resource set corresponding to the channel quality that meets the second preset condition, the terminal device sends, to the network device, information about the selected control resource set corresponding to the channel quality that meets the second preset condition; and the network device receives the information, sent by the terminal device, about the control resource set that meets the second preset condition, and then sends the PDCCH to the terminal device by using the control resource set that meets the second preset condition.

According to the method embodiment shown in FIG. 15, after the communication failure occurs on the PDCCH on the first control resource set, if the terminal device detects both the PDCCH on the first control resource set and a PDCCH on a control resource set used for link recovery, the terminal device selects a PDCCH with better channel quality in a control resource set to receive downlink control information. Therefore, communication transmission quality is improved.

It should be noted that the "moment" described in the foregoing embodiments may be an instantaneous location or an instantaneous time in a communication transmission process, or may be represented as a time unit, where the time unit may be a time-domain unit such as a subframe (Subframe), a slot (slot), or a symbol (symbol). The "time window" or the "time period" described in the embodiments of the present invention may be represented as time or a time domain resource between two time units in a communication transmission process. In one embodiment, the "time window" may be time between two slots, time between two subframes, time between two symbols, or the like; and the "time period" may be time between two slots, time between two subframes, time between two symbols, or the like. For example, an end moment of a first time period is equal to a moment at which a terminal device receives communication failure recovery response information, and the end moment of the first time period is equal to a moment at which the terminal device receives reconfigured QCL assumption information for the first time after receiving the communication failure recovery response information. In this case, assuming that the moment at which the terminal device receives the communication failure recovery response information is a slot 1, and the moment at which the terminal device receives the reconfigured QCL assumption information for the first time after receiving the communication failure recovery response information is a slot 2, the first time period is a time period from the slot 1 to the slot 2.

Figure 17:
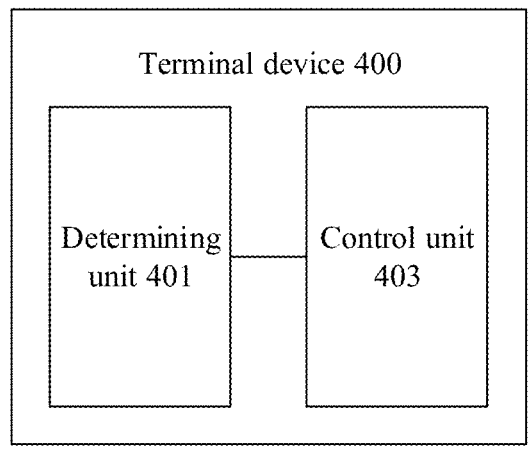
FIG. 17 is a functional block diagram of another terminal device according to an embodiment of the present invention.

FIG. 17 is a schematic structural diagram of another terminal device according to an embodiment of the present invention. As shown in FIG. 17, the terminal device 400 may include a determining unit 401 and a control unit 403.

The determining unit 401 is configured to determine, at a moment n, that a communication failure occurs on a physical downlink control channel PDCCH on a first control resource set.

The control unit 403 is configured to: if it is detected, within a first time period after the moment n, that channel quality of the PDCCH on the first control resource set meets a first preset condition, cancel sending of communication failure recovery request information, and/or stop timing of a communication failure recovery clock.

In one embodiment, an end moment of the first time period is earlier than or equal to a moment at which the terminal device receives communication failure recovery response information, or an end moment of the first time period is earlier than or equal to a moment at which the terminal device receives reconfigured quasi co-location QCL assumption information for the first time after receiving communication failure recovery response information In one embodiment, a start moment of the first time period is later than or equal to the moment n, and/or the end moment of the first time period is earlier than or equal to a moment at which the terminal device sends the communication failure recovery request information for the first time after the moment n.

In one embodiment, a start moment of the first time period is later than or equal to an end moment of a communication failure recovery response time window, and/or the end moment of the first time period is earlier than or equal to a moment at which the terminal device sends the communication failure recovery request information for a next time after the communication failure recovery response time window.

In one embodiment, that channel quality of the physical downlink control channel PDCCH on the first control resource set meets a first preset condition includes:

the terminal device detects the PDCCH on the first control resource set L times, where L is a positive integer greater than or equal to 1;

channel quality corresponding to a demodulation reference signal DMRS on the PDCCH is greater than or equal to channel quality corresponding to a first reference signal, where the first reference signal is a downlink reference signal that is associated with the communication failure recovery request information and that is greater than or equal to a first threshold;

a difference between the channel quality corresponding to the DMRS on the PDCCH and signal quality of the first reference signal is greater than or equal to a second threshold;

the channel quality corresponding to the DMRS on the PDCCH is greater than or equal to a third threshold;

channel quality corresponding to a second reference signal is greater than or equal to the channel quality corresponding to the first reference signal, where the second reference signal is used to detect that the communication failure occurs on the PDCCH on the first control resource set;

a difference between the channel quality corresponding to the second reference signal and the signal quality of the first reference signal is greater than or equal to a fourth threshold; and/or the channel quality corresponding to the second reference signal is greater than or equal to a fifth threshold.

In one embodiment, the channel quality includes one or more of reference signal received power RSRP, reference signal received quality RSRQ, a block error ratio BLER, a signal to interference plus noise ratio SINR, a signal-to-noise ratio SNR, and a channel quality indicator CQI.

In one embodiment, a delay between the moment n and the moment at which the terminal device sends the communication failure recovery request information for the first time after the moment n is greater than or equal to a sixth threshold.

In one embodiment, the terminal device 400 further includes a detection unit, configured to detect the PDCCH on the first control resource set within the first time period.

In one embodiment, the control unit 403 is further configured to: control the terminal device 400 to skip detecting the PDCCH on the first control resource set and a PDCCH on a second control resource set within a second time period after sending the communication failure recovery request information by the terminal device 400, where the second control resource set is used by a network device to send the communication failure recovery response information to the terminal device, and an end moment of the second time period is earlier than or equal to a start moment of a next communication failure recovery response time window after sending the communication failure recovery request information by the terminal device.

In one embodiment, the terminal device 400 detects only the PDCCH on the second control resource set within a communication failure recovery response time window, where the second control resource set is used by the network device to send the communication failure recovery response information to the terminal device.

In one embodiment, that the communication failure occurs on the PDCCH on the first control resource set includes: the second reference signal corresponding to the first control resource set is less than or equal to a seventh threshold Q consecutive times, where Q starts to be counted when a reference signal corresponding to a maximum periodicity in the second reference signal is less than or equal to the seventh threshold, and the second reference signal is used to determine that the communication failure occurs on the PDCCH on the first control resource set.

It may be understood that, for specific implementations of the functional units included in the terminal device 400, refer to the foregoing embodiments. Details are not described herein again.

Figure 18:
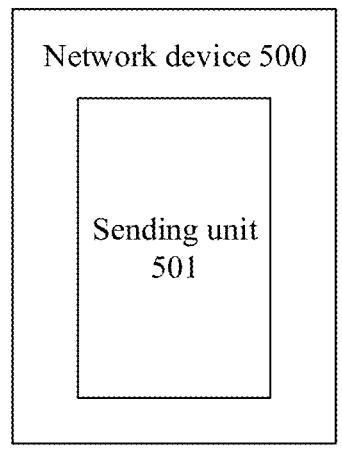
FIG. 18 is a functional block diagram of another terminal device according to an embodiment of the present invention.

FIG. 18 is a schematic structural diagram of another network device according to an embodiment of the present invention. As shown in FIG. 18, the network device 500 may include a sending unit 501.

The sending unit 501 is configured to send a PDCCH by using a first control resource set within a first time period after a moment n, where the moment n is a moment at which a communication failure occurs on the PDCCH on the first control resource set.

In one embodiment, an end moment of the first time period is earlier than or equal to a moment at which the network device sends communication failure recovery response information, or an end moment of the first time period is earlier than or equal to a moment at which the network device sends reconfigured quasi co-location QCL assumption information for the first time after sending communication failure recovery response information In one embodiment, the sending unit 501 is further configured to:

send a PDCCH by using a second control resource set within a communication failure recovery response time window, where the second control resource set is used by the terminal device to receive the communication failure recovery response information.

In one embodiment, that the communication failure occurs on the PDCCH on the first control resource set includes: a second reference signal corresponding to the first control resource set is less than or equal to a seventh threshold Q consecutive times, where Q starts to be counted when a reference signal corresponding to a maximum periodicity in the second reference signal is less than or equal to the seventh threshold, and the second reference signal is used to determine that the communication failure occurs on the PDCCH on the first control resource set.

It may be understood that, for a specific implementation of the functional unit included in the network device 500, refer to the foregoing embodiments. Details are not described herein again.

Figure 19:
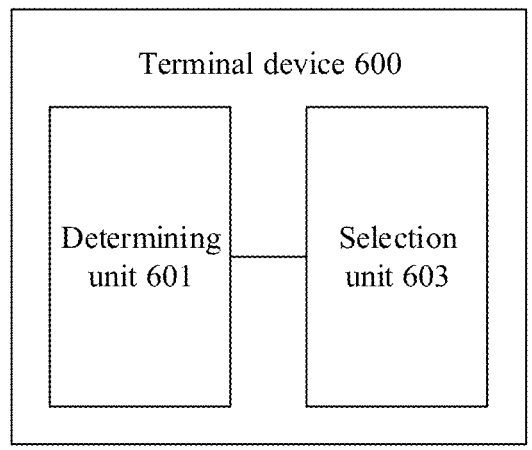
FIG. 19 is a functional block diagram of another network device according to an embodiment of the present invention.

FIG. 19 is a schematic structural diagram of another terminal device according to an embodiment of the present invention. As shown in FIG. 19, the terminal device 600 may include a determining unit 601 and a selection unit 603.

The determining unit 601 is configured to determine, at a moment n, that a communication failure occurs on a PDCCH on a first control resource set.

The selection unit 603 is configured to: if the first control resource set and a second control resource set are detected within a third time period after the moment n, select, from the first control resource set and the second control resource set, a control resource set corresponding to channel quality that meets a second preset condition, to receive physical downlink control information, where the second control resource set is used by a network device to send communication failure recovery response information to the terminal device.

In one embodiment, the control resource set, from the first control resource set and the second control resource set, corresponding to the channel quality that meets the second preset condition includes:

higher channel quality in channel quality corresponding to a DMRS corresponding to the first control resource set and channel quality corresponding to a DMRS corresponding to the second control resource set, higher channel quality in channel quality corresponding to a DMRS corresponding to the first control resource set and channel quality corresponding to a first reference signal corresponding to the second control resource set, higher channel quality in channel quality corresponding to a second reference signal corresponding to the first control resource set and channel quality corresponding to a DMRS corresponding to the second control resource set, or higher channel quality in channel quality corresponding to a second reference signal corresponding to the first control resource set and channel quality corresponding to a first reference signal corresponding to the second control resource set.

The first reference signal is a downlink reference signal that is associated with communication failure recovery request information and that is greater than or equal to an eighth threshold, and the second reference signal is used to detect that the communication failure occurs on the PDCCH on the first control resource set.

In one embodiment, a start moment of the third time period is later than or equal to a moment at which the terminal device receives the communication failure recovery response information, and/or an end moment of the third time period is earlier than or equal to a moment at which the terminal device receives reconfigured quasi co-location QCL assumption information for the first time after receiving the communication failure recovery response information.

In one embodiment, the channel quality includes one or more of RSRP, RSRQ, a BLER, a SINR, a s SNR, and a CQI.

In one embodiment, that the communication failure occurs on the PDCCH on the first control resource set includes: the second reference signal corresponding to the first control resource set is less than or equal to a ninth threshold Q consecutive times, where Q starts to be counted when a reference signal corresponding to a maximum periodicity in the second reference signal is less than or equal to the ninth threshold, and the second reference signal is used to determine that the communication failure occurs on the PDCCH on the first control resource set.

In one embodiment, the terminal device 400 further includes a detection unit, configured to detect the PDCCH on the first control resource set and a PDCCH on the second control resource set within the third time period after the moment n.

It may be understood that, for specific implementations of the functional units included in the terminal device 600, refer to the foregoing embodiments. Details are not described herein again.

Figure 20:
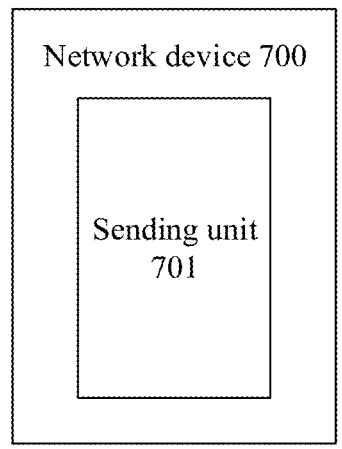
FIG. 20 is a functional block diagram of another network device according to an embodiment of the present invention.

FIG. 20 is a schematic structural diagram of another network device according to an embodiment of the present invention. As shown in FIG. 20, the network device 700 may include a sending unit 701.

The sending unit 701 is configured to send a first control resource set and a second control resource set within a third time period after a moment n, where the moment n is a moment at which a communication failure occurs on a PDCCH on the first control resource set, the second control resource set is used by the network device to send communication failure recovery response information to the terminal device, and the terminal device selects, from the first control resource set and the second control resource set, a control resource set that meets a second preset condition, to receive physical downlink control information.

In one embodiment, the control resource set that meets the second preset condition includes:

higher channel quality in channel quality corresponding to a DMRS corresponding to the first control resource set and channel quality corresponding to a DMRS corresponding to the second control resource set, higher channel quality in channel quality corresponding to a DMRS corresponding to the first control resource set and channel quality corresponding to a first reference signal corresponding to the second control resource set, higher channel quality in channel quality corresponding to a second reference signal corresponding to the first control resource set and channel quality corresponding to a DMRS corresponding to the second control resource set, or higher channel quality in channel quality corresponding to a second reference signal corresponding to the first control resource set and channel quality corresponding to a first reference signal corresponding to the second control resource set.

The first reference signal is a downlink reference signal that is associated with communication failure recovery request information and that is greater than or equal to an eighth threshold, and the second reference signal is used to detect that the communication failure occurs on the PDCCH on the first control resource set.

In one embodiment, a start moment of the third time period is later than or equal to a moment at which the network device sends the communication failure recovery response information, and/or an end moment of the third time period is earlier than or equal to a moment at which the network device sends reconfigured quasi co-location QCL assumption information for the first time after sending the communication failure recovery response information.

In one embodiment, the channel quality includes one or more of RSRP, RSRQ, a io BLER, a SINR, a SNR, and a CQI.

In one embodiment, that the communication failure occurs on the PDCCH on the first control resource set includes: the second reference signal corresponding to the first control resource set is less than or equal to a ninth threshold Q consecutive times, where Q starts to be counted when a reference signal corresponding to a maximum periodicity in the second reference signal is less than or equal to the ninth threshold, and the second reference signal is used to determine that the communication failure occurs on the PDCCH on the first control resource set.

It may be understood that, for a specific implementation of the functional unit included in the network device 700, refer to the foregoing embodiments. Details are not described herein again.

Methods or algorithm operations described in combination with the content disclosed in this embodiment of the present invention may be implemented by hardware, or may be implemented by a processor by executing a software instruction. The software instruction may include a corresponding software module. The software module may be stored in a RAM, a flash memory, a ROM, an erasable programmable read only memory (EPROM), an electrically erasable programmable read only memory (EEPROM), a register, a hard disk, a removable hard disk, a compact disc read-only memory (CD-ROM), or any other form of storage medium well-known in the art. For example, a storage medium is coupled to a processor, so that the processor can read information from the storage medium or write information into the storage medium. Certainly, the storage medium may be a component of the processor. The processor and the storage medium may be located in an ASIC. In addition, the ASIC may be located in a transceiver or a relay device. Certainly, the processor and the storage medium may exist in a radio access network device or a terminal device as discrete components.

A person skilled in the art should be aware that in the foregoing one or more examples, functions described in the embodiments of the present invention may be implemented by hardware, software, firmware, or any combination thereof. When being implemented by software, the functions may be stored in a computer-readable medium or transmitted as one or more instructions or code in a computer-readable medium. The computer-readable medium includes a computer storage medium and a communications medium. The communications medium includes any medium that enables a computer program to be transmitted from one place to another. The storage medium may be any available medium accessible to a general-purpose or special-purpose computer.

In the foregoing specific implementations, the objectives, technical solutions, and benefits of the embodiments of the present invention are described in detail. It should be understood that the foregoing descriptions are merely specific implementations of the embodiments of the present invention, but are not intended to limit the protection scope of the embodiments of the present invention. Any modification, equivalent replacement, or improvement made based on the technical solutions of the embodiments of the present invention shall fall within the protection scope of the embodiments of the present invention.

What is claimed is:

1. An information transmission method, comprising:
   determining, by a terminal device at a moment n, that a communication failure occurs on a physical downlink control channel (PDCCH) on a first control resource set;
   if the terminal device detects, within a first time period after the moment n, that channel quality of the PDCCH on the first control resource set meets a first preset condition to recover a communication link after the communication failure occurs, canceling, by the terminal device, sending of communication failure recovery request information, and stopping, by the terminal device, timing of a communication failure recovery clock; and
   skipping detecting, by the terminal device, the PDCCH on the first control resource set and a PDCCH on a second control resource set within a second time period after sending the communication failure recovery request information.

2. The method according to claim 1, wherein an end moment of the first time period is earlier than or equal to a moment at which the terminal device receives communication failure recovery response information, or
   an end moment of the first time period is earlier than or equal to a moment at which the terminal device receives reconfigured quasi co-location (QCL) assumption information for the first time after receiving communication failure recovery response information.

3. The method according to claim 1, wherein a start moment of the first time period is later than or equal to the moment n, and/or the end moment of the first time period is earlier than or equal to a moment at which the terminal device sends the communication failure recovery request information for the first time after the moment n.

4. The method according to claim 1, wherein the start moment of the first time period is later than or equal to an end moment of a communication failure recovery response time window, and/or the end moment of the first time period is earlier than or equal to a moment at which the terminal device sends the communication failure recovery request information for a next time after the communication failure recovery response time window.

5. The method according to claim 1, wherein that channel quality of the physical downlink control channel (PDCCH) on the first control resource set meets a first preset condition comprises:
   the terminal device detects the PDCCH on the first control resource set L times, wherein L is a positive integer greater than or equal to 1;
   channel quality corresponding to a demodulation reference signal (DMRS) on the PDCCH is greater than or equal to channel quality corresponding to a first reference signal, wherein the first reference signal is a downlink reference signal that is associated with the communication failure recovery request information and that is greater than or equal to a first threshold;
   a difference between the channel quality corresponding to the DMRS on the PDCCH and signal quality of the first reference signal is greater than or equal to a second threshold;
   the channel quality corresponding to the DMRS on the PDCCH is greater than or equal to a third threshold;
   channel quality corresponding to a second reference signal is greater than or equal to the channel quality corresponding to the first reference signal, wherein the second reference signal is used to detect that the communication failure occurs on the PDCCH on the first control resource set;
   a difference between the channel quality corresponding to the second reference signal and the signal quality of the first reference signal is greater than or equal to a fourth threshold; and/or
   the channel quality corresponding to the second reference signal is greater than or equal to a fifth threshold.

6. The method according to claim 5, wherein the communication failure occurs on the physical downlink control channel (PDCCH) on the first control resource set comprises:
   the second reference signal corresponding to the first control resource set is less than or equal to a seventh threshold Q consecutive times, wherein Q starts to be counted when a reference signal corresponding to a maximum periodicity in the second reference signal is less than or equal to the seventh threshold, and the second reference signal is used to determine that the communication failure occurs on the PDCCH on the first control resource set.

7. The method according to claim 1, wherein the channel quality comprises one or more of reference signal received power (RSRP), reference signal received quality (RSRQ), a block error ratio (BLER), a signal to interference plus noise ratio (SINR), a signal-to-noise ratio (SNR), and a channel quality indicator (CQI).

8. The method according to claim 1, wherein a delay between the moment n and the moment at which the terminal device sends the communication failure recovery request information for the first time after the moment n is greater than or equal to a sixth threshold.

9. The method according to claim 1, further comprising: detecting, by the terminal device, the PDCCH on the first control resource set within the first time period.

10. The method according to claim 1,
    wherein the second control resource set is used by a network device to send the communication failure recovery response information to the terminal device, and an end moment of the second time period is earlier than or equal to a start moment of a next communication failure recovery response time window after sending the communication failure recovery request information by the terminal device.

11. The method according to claim 1, wherein the terminal device detects only a PDCCH on the second control resource set within a communication failure recovery response time window, wherein the second control resource set is used by a network device to send communication failure recovery response information to the terminal device.

12. An information transmission method, comprising:
sending, by a network device to a terminal device, a physical downlink control channel (PDCCH) by using a first control resource set within a first time period after a moment n, wherein the moment n is a moment at which a communication failure occurs on the PDCCH on the first control resource set, wherein if the terminal device detects, within a first time period after the moment n, that channel quality of the PDCCH on the first control resource set meets a first preset condition to recover a communication link after the communication failure occurs, the terminal device cancels sending of communication failure recovery request information, and skips detecting the PDCCH on the first control resource set and a PDCCH on a second control resource set within a second time period after sending the communication failure recovery request information.

13. The method according to claim 12, wherein an end moment of the first time period is earlier than or equal to a moment at which the network device sends communication failure recovery response information, or
an end moment of the first time period is earlier than or equal to a moment at which the network device sends reconfigured quasi co-location (QCL) assumption information for the first time after sending communication failure recovery response information.

14. The method according to claim 12, further comprising: sending, by the network device, the PDCCH by using a second control resource set within a communication failure recovery response time window, wherein the second control resource set is used by the network device to send communication failure recovery response information to the terminal device.

15. A non-transitory machine-readable storage medium having instructions stored therein, which when executed by a processor of a terminal device, cause the processor to perform operations, the operations comprising:
determining, at a moment n, that a communication failure occurs on a physical downlink control channel (PDCCH) on a first control resource set;
if the terminal device detects, within a first time period after the moment n, that channel quality of the PDCCH on the first control resource set meets a first preset condition to recover a communication link after the communication failure occurs, canceling sending of communication failure recovery request information, and stopping timing of a communication failure recovery clock; and
skipping detecting the PDCCH on the first control resource set and a PDCCH on a second control resource set within a second time period after sending the communication failure recovery request information.

16. The non-transitory machine-readable storage medium according to claim 15, wherein an end moment of the first time period is earlier than or equal to a moment at which the terminal device receives communication failure recovery response information, or
an end moment of the first time period is earlier than or equal to a moment at which the terminal device receives reconfigured quasi co-location (QCL) assumption information for the first time after receiving communication failure recovery response information.

17. The non-transitory machine-readable storage medium according to claim 15, wherein a start moment of the first time period is later than or equal to the moment n, and/or the end moment of the first time period is earlier than or equal to a moment at which the terminal device sends the communication failure recovery request information for the first time after the moment n.

18. The non-transitory machine-readable storage medium according to claim 15, wherein the start moment of the first time period is later than or equal to an end moment of a communication failure recovery response time window, and/or the end moment of the first time period is earlier than or equal to a moment at which the terminal device sends the communication failure recovery request information for a next time after the communication failure recovery response time window.

19. The non-transitory machine-readable storage medium according to claim 15, wherein that channel quality of the physical downlink control channel (PDCCH) on the first control resource set meets a first preset condition comprises:
the terminal device detects the PDCCH on the first control resource set L times, wherein L is a positive integer greater than or equal to 1;
channel quality corresponding to a demodulation reference signal (DMRS) on the PDCCH is greater than or equal to channel quality corresponding to a first reference signal, wherein the first reference signal is a downlink reference signal that is associated with the communication failure recovery request information and that is greater than or equal to a first threshold;
a difference between the channel quality corresponding to the DMRS on the PDCCH and signal quality of the first reference signal is greater than or equal to a second threshold;
the channel quality corresponding to the DMRS on the PDCCH is greater than or equal to a third threshold;
channel quality corresponding to a second reference signal is greater than or equal to the channel quality corresponding to the first reference signal, wherein the second reference signal is used to detect that the communication failure occurs on the PDCCH on the first control resource set;
a difference between the channel quality corresponding to the second reference signal and the signal quality of the first reference signal is greater than or equal to a fourth threshold; and/or
the channel quality corresponding to the second reference signal is greater than or equal to a fifth threshold.

20. The non-transitory machine-readable storage medium according to claim 15, wherein the channel quality comprises one or more of reference signal received power (RSRP), reference signal received quality (RSRQ), a block error ratio (BLER), a signal to interference plus noise ratio (SINR), a signal-to-noise ratio (SNR), and a channel quality indicator (CQI).

* * * * *